United States Patent
Matlin et al.

(10) Patent No.: US 11,071,378 B2
(45) Date of Patent: *Jul. 27, 2021

(54) MULTI-POSITIONAL ARTICULATING PLATFORM SYSTEM

(71) Applicant: FELLOWES, INC., Itasca, IL (US)

(72) Inventors: Tai Hoon K. Matlin, Round Lake Beach, IL (US); Shawn Michael Applegate, Streamwood, IL (US); Damian Stadnicki, Palatine, IL (US); Robert Day, Itasca, IL (US)

(73) Assignee: FELLOWES, INC., Itasca, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/818,359

(22) Filed: Mar. 13, 2020

(65) Prior Publication Data

US 2020/0214441 A1 Jul. 9, 2020

Related U.S. Application Data

(63) Continuation of application No. 16/134,220, filed on Sep. 18, 2018, now Pat. No. 10,610,010.

(Continued)

(51) Int. Cl.
*A47B 21/03* (2006.01)
*A47B 21/02* (2006.01)
(Continued)

(52) U.S. Cl.
CPC .......... *A47B 21/0314* (2013.01); *A47B 21/02* (2013.01); *F16M 11/2014* (2013.01);
(Continued)

(58) Field of Classification Search
CPC ..... A47B 21/0314; A47B 21/02; A47B 21/04; A47B 2021/0321; A47B 2021/0342;
(Continued)

(56) References Cited

U.S. PATENT DOCUMENTS 4,687,167 A 8/1987 Shalka
4,768,744 A 9/1988 Leeds
(Continued)

FOREIGN PATENT DOCUMENTS

CA 3007736 A1 * 12/2018 ........... H01R 25/006

*Primary Examiner* — Jose V Chen
(74) *Attorney, Agent, or Firm* — Pillsbury Winthrop Shaw Pittman LLP

(57) ABSTRACT

A variable height workstation system comprises a base, a variable height platform, a lift mechanism, a lower adjustable pivot assembly, and an upper adjustable pivot assembly. The base is configured to be mounted to a support surface. The lift mechanism is configured to move the variable height platform between a fully lowered and raised position. The lower adjustable pivot assembly is configured to be connected be to the base and the lift mechanism. The lower adjustable pivot assembly comprises a lower adjustable force regulator configured to adjust a force required to rotate a lower pivot member about its first vertical rotational axis. The upper adjustable pivot assembly is configured to be connected to the lift mechanism and the variable height platform. The upper adjustable pivot assembly comprises an upper adjustable force regulator configured to adjust a force required to rotate an upper pivot member about its second vertical rotational axis.

27 Claims, 9 Drawing Sheets

Related U.S. Application Data

(60) Provisional application No. 62/559,835, filed on Sep. 18, 2017.

(51) Int. Cl.

| | | |
|---|---|---|
| *F16M 11/20* | (2006.01) | |
| *F16M 11/24* | (2006.01) | |
| A47B 21/04 | (2006.01) | |
| F16M 11/08 | (2006.01) | |
| F16M 13/02 | (2006.01) | |

(52) U.S. Cl.
CPC ......... *F16M 11/2092* (2013.01); *F16M 11/24* (2013.01); A47B 21/04 (2013.01); A47B 2021/0321 (2013.01); A47B 2021/0364 (2013.01); A47B 2200/0085 (2013.01); A47B 2200/0088 (2013.01); F16M 11/08 (2013.01); F16M 13/02 (2013.01); F16M 2200/024 (2013.01); F16M 2200/044 (2013.01); F16M 2200/063 (2013.01)

(58) Field of Classification Search
CPC ........ A47B 2021/035; A47B 2021/066; A47B 2021/0364; A47B 2200/0085; A47B 2200/0088; F16M 11/08
USPC ......... 108/50.01, 50.02, 94, 95, 96; 248/918
See application file for complete search history.

(56) References Cited

U.S. PATENT DOCUMENTS

| | | | |
|---|---|---|---|
| 4,844,387 A | 7/1989 | Sorgi | |
| 4,852,500 A | 8/1989 | Ryburg | |
| 5,553,820 A * | 9/1996 | Karten | A47B 21/0314 248/181.2 |
| 5,568,773 A * | 10/1996 | Hung | A47B 21/00 108/50.01 |
| 5,765,797 A * | 6/1998 | Greene | A47B 21/0314 248/398 |
| 6,076,785 A | 6/2000 | Oddsen | |
| 6,409,134 B1 | 6/2002 | Oddsen | |
| 6,491,268 B1 | 12/2002 | Channer | |
| 6,609,691 B2 * | 8/2003 | Oddsen, Jr. | F16M 11/10 248/278.1 |
| 6,854,698 B2 * | 2/2005 | Oddsen, Jr. | F16M 11/2014 248/274.1 |
| 7,222,826 B1 | 5/2007 | Berglund | |
| 7,252,277 B2 * | 8/2007 | Sweere | F16M 11/105 248/284.1 |
| 7,597,299 B2 * | 10/2009 | Papendieck | F16G 11/12 248/281.11 |
| 7,677,518 B2 * | 3/2010 | Chouinard | A47B 21/02 248/370 |
| 7,717,383 B2 | 5/2010 | Russell | |
| 7,823,973 B2 * | 11/2010 | Dragusin | A63F 13/08 297/217.3 |
| 7,841,049 B2 * | 11/2010 | Wang | A47B 21/0314 16/284 |
| 7,922,137 B2 | 4/2011 | Derry | |
| 8,191,487 B2 | 6/2012 | Theesfeld | |
| 8,196,884 B2 | 6/2012 | Chiang | |
| 8,310,468 B2 * | 11/2012 | Martin | F16M 11/10 345/204 |
| 8,667,906 B2 | 3/2014 | Anglavis | |
| 9,113,703 B2 | 8/2015 | Flaherty | |
| 9,301,671 B2 | 4/2016 | Jarl | |
| 9,316,346 B2 | 4/2016 | Lau | |
| 9,717,329 B2 | 8/2017 | Hazzard et al. | |
| 9,888,766 B2 | 2/2018 | Chuang | |
| 9,890,899 B2 | 2/2018 | Theis | |
| 9,993,071 B2 * | 6/2018 | Hung | F16M 11/2021 |
| 10,323,791 B1 | 6/2019 | Liu | |
| D874,199 S * | 2/2020 | Choi | D6/707 |
| 2004/0188573 A1* | 9/2004 | Weatherly | A47B 81/061 248/125.1 |
| 2005/0022699 A1* | 2/2005 | Goza | A47B 21/0314 108/50.01 |
| 2008/0232059 A1* | 9/2008 | Allen | E05B 73/0082 361/679.03 |
| 2010/0066132 A1 | 3/2010 | Tal Marchand | |
| 2010/0327129 A1* | 12/2010 | Chen | F16M 11/2092 248/121 |
| 2012/0119040 A1* | 5/2012 | Ergun | A47B 97/06 248/126 |
| 2014/0137773 A1* | 5/2014 | Mandel | G06Q 10/109 108/50.11 |
| 2015/0230602 A1 | 8/2015 | Glockl | |
| 2018/0248404 A1* | 8/2018 | Pinewski | A47B 21/06 |
| 2020/0221867 A1* | 7/2020 | Hoffman | A47B 83/02 |

* cited by examiner

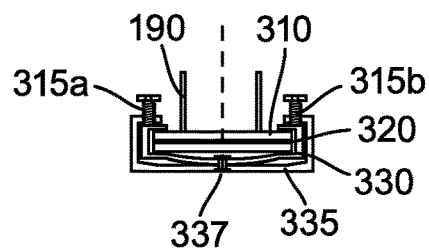
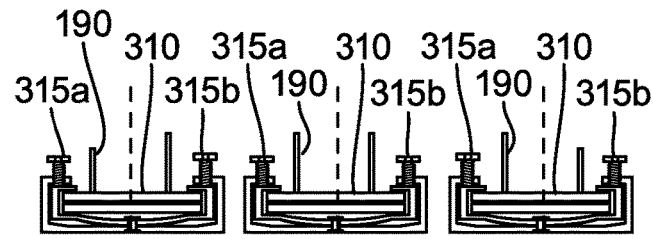
FIG. 5a  FIG. 5b
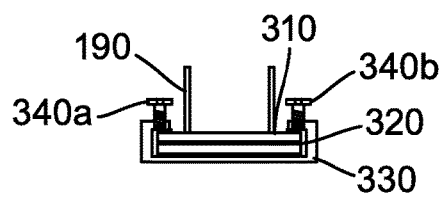
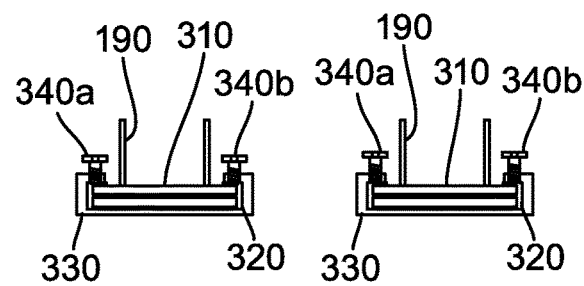
FIG. 6a  FIG. 6b
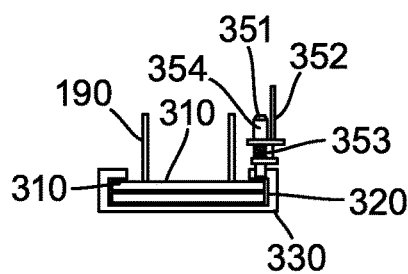
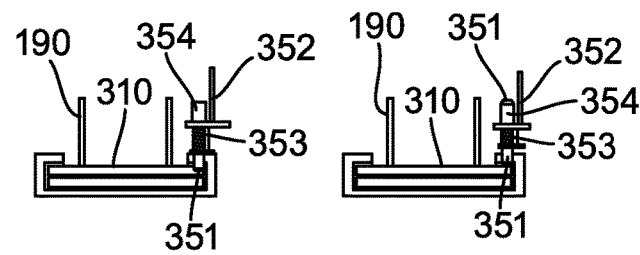
FIG. 7a  FIG. 7b

MULTI-POSITIONAL ARTICULATING PLATFORM SYSTEM

CROSS-REFERENCE TO PRIOR APPLICATION

The present application is a continuation of U.S. patent application Ser. No. 16/134,220 filed Sep. 18, 2018, which claims benefit to U.S. Patent Application 62/559,835 filed Sep. 18, 2017, the contents of which are incorporated herein in their entireties.

BACKGROUND

Field

The present patent application relates to sit stand products, more specifically, to desktop and tabletop articulating arm base sit stand devices.

Description of Related Art

Sit stand devices typically allow an office worker to conduct their tasks in a sitting position and a standing position by raising or lowering a work surface (e.g., with a keyboard and a mouse along with a monitor or several monitors).

Monitor arms are similar to some of the current sit stand devices. They are used on work surfaces, for example, to hold flat screen computer monitors in place. Since one or several of the flat screen computer monitors are relatively light, the fully articulating monitor arms allow the flat screen computer monitor to move through its full range of motion without being challenged by stability issues. Typically, these types of devices use lightweight ball or pivot type joints. They have several segmented arm sections while they lack a work surface.

Adapted monitor arms as sit stand devices have started to gain momentum in the market today. Device manufacturers simply took a monitor arm added a work surface to turn them to articulating sit stand devices. The problems that arise from this type of execution is that the articulating assemblies fold vertically and are not robust enough overcome the instability created by the multitude of articulating sections. This instability makes them impractical for varied tasks other than to hold a monitor and keyboard.

Sit stand towers allow one to go from a sitting position to a standing work position. They can be directly situated onto a current work surface. As sedentary office and computer work has been deemed as harmful, there has been heightened awareness and need for devices which allow one to work efficiently in both the sitting and standing position. Typically, these types of tower devices allow a device such as a laptop computer to raise and lower with the user, but the more practical products have large enough surface space or mounts to support one to two monitors and a keyboard such as, for example, the Ergotron WorkFit-S. The Ergotron device clamps onto the front (i.e., away from the user) of a work desk, supports a moveable keyboard and mouse surface that travel up and down a track within a vertically protruding tower. The tower also houses a lift aid that helps the moveable surface to move up and down the tower track easily. This type of device typically does not have a position lock and will move when disturbed with a minimal amount of force. U.S. Pat. No. 9,717,329 shows an example of this type of prior art device.

Sit stand surface based units can accommodate larger work surfaces than both the articulating arm based units and the tower based units. The sit stand surface based unit can be directly situated onto a current work surface. The sit stand surface based unit is limited to a predictably linear path of travel (i.e., basically up and down movement). Since the work surface is larger, the sit stand surface based unit has a latch mechanism that allows one to stop in various vertical positions within the limited linear path of travel. Since the larger work surface units are heavier and typically hold more weight, a lifting aid of some sort is also incorporated to help the operator/user to lift the larger heavier work surface and loads upwards when moving to a standing position. U.S. Pat. No. 9,113,703 is an example of this type of prior art device.

An ergonomic sit/stand keyboard support mechanism is disclosed, for example, in U.S. Pat. No. 6,076,785. This patent discloses a sit stand device specifically designed to support a keyboard. The device mounts to the underside of a desk, slides in and out and articulates up above the work surface on which it has been mounted. Down below the work surface, it has been mounted by way of a four bar or parallel linkage means with an integrated pneumatic gas spring. Additionally, the device has adjustably raising and lowering pivot plates. The over-articulation and weakness of the connection points limit this product to function only as a keyboard support.

As this category of products matures, there are many different types of sit stand device offerings in the market today. However, for at least the reasons presented above, a sit stand table may not be the right device for the office or home office and another type of device is needed. The present patent application endeavors to provide various improvements over prior mentioned examples along with any similar examples that may not have been mentioned or included. The present patent application discloses a device that takes into consideration these important observations noted above and solves them in a manner to be unique and beneficial to those seeking these types of systems in the market.

BRIEF SUMMARY

In one embodiment of the present patent application, a variable height workstation system is provided. The variable height workstation system comprises a base, a variable height platform, a lift mechanism, a lower adjustable pivot assembly, and an upper adjustable pivot assembly. The base is configured to be mounted to a support surface. The lift mechanism is configured to move the variable height platform between a fully lowered position and a raised position. The lower adjustable pivot assembly is configured to be connected to the base and the lift mechanism. The lower adjustable pivot assembly comprises a lower pivot member configured to be rotated about a first vertical rotational axis. The lower adjustable pivot assembly comprises a lower adjustable force regulator configured to adjust a force required to rotate the lower pivot member about the first vertical rotational axis. The upper adjustable pivot assembly is configured to be connected to the lift mechanism and the variable height platform. The upper adjustable pivot assembly comprises an upper pivot member configured to be rotated about a second vertical rotational axis spaced from the first vertical rotational axis. The upper adjustable pivot assembly comprises an upper adjustable force regulator configured to adjust a force required to rotate the upper pivot member about its second vertical rotational axis. The lift mechanism, the lower adjustable pivot assembly and the upper adjustable pivot assembly are configured to maintain an essentially horizontal orientation of the variable height platform between the fully lowered position and the raised position.

In another embodiment of the present patent application, a variable height workstation system is provided. The variable height workstation system comprises a base, a variable height platform, a lift mechanism, a lower adjustable pivot assembly, a lock, and an upper adjustable pivot assembly. The base is configured to be mounted to a support surface. The lift mechanism is configured to move the variable height platform between a fully lowered position and a raised position. The lower adjustable pivot assembly is configured to be connected to the base and the lift mechanism. The lower adjustable pivot assembly comprises a lower pivot member configured to be rotated about a first vertical rotational axis. The upper adjustable pivot assembly is configured to be connected to the lift mechanism and the variable height platform. The upper adjustable pivot assembly comprises an upper pivot member configured to be rotated about a second vertical rotational axis spaced from the first vertical rotational axis. The lock is configured to move the upper pivot member between a lock position and a release position, wherein, when the upper pivot member is in the lock position, the upper pivot member does not rotate about the second vertical rotational axis. The lift mechanism, the lower adjustable pivot assembly and the upper adjustable pivot assembly are configured to maintain an essentially horizontal orientation of the variable height platform between the fully lowered position and the raised position.

These and other aspects of the present patent application, as well as the methods of operation and functions of the related elements of structure and the combination of parts and economies of manufacture, will become more apparent upon consideration of the following description with reference to the accompanying drawings, all of which form a part of this specification, wherein like reference numerals designate corresponding parts in the various figures. In one embodiment of the present patent application, the structural components illustrated herein are drawn to scale. It is to be expressly understood, however, that the drawings are for the purpose of illustration and description only and are not intended as a definition of the limits of the present patent application. It shall also be appreciated that the features of one embodiment disclosed herein can be used in other embodiments disclosed herein. As used in the specification and in the claims, the singular form of "a", "an", and "the" include plural referents unless the context clearly dictates otherwise. In addition, as used in the specification and the claims, the term "or" means "and/or" unless the context clearly dictates otherwise. It should also be appreciated that some of the components and features discussed herein may be discussed in connection with only one (singular) of such components, and that additional like components which may be disclosed herein may not be discussed in detail for the sake of reducing redundancy.

Other aspects, features, and advantages of the present patent application will become apparent from the following detailed description, the accompanying drawings, and the appended claims.

BRIEF DESCRIPTION OF THE DRAWINGS

Various embodiments are disclosed, by way of example only, with reference to the accompanying schematic drawings in which corresponding reference symbols indicate corresponding parts, in which

FIG. 5a shows a simplified side view of one of two adjustable pivot assemblies with an adjustable gimble in accordance with an embodiment of the present patent application;

FIG. 5b shows sequential views of one of two adjustable pivot assemblies being adjusted in accordance with an embodiment of the present patent application;

FIG. 6a shows a simplified side view of one of two adjustable pivot assemblies in accordance with another embodiment of the present patent application;

FIG. 6b shows sequential views of one of two adjustable pivot assemblies being adjusted in accordance with another embodiment of the present patent application;

FIG. 7a shows a simplified side view of one of two adjustable pivot assemblies in accordance with another embodiment of the present patent application;

FIG. 7b shows sequential views of one of two adjustable pivot assemblies being adjusted in accordance with another embodiment of the present patent application;

DETAILED DESCRIPTION OF THE DRAWINGS

Figure 1:
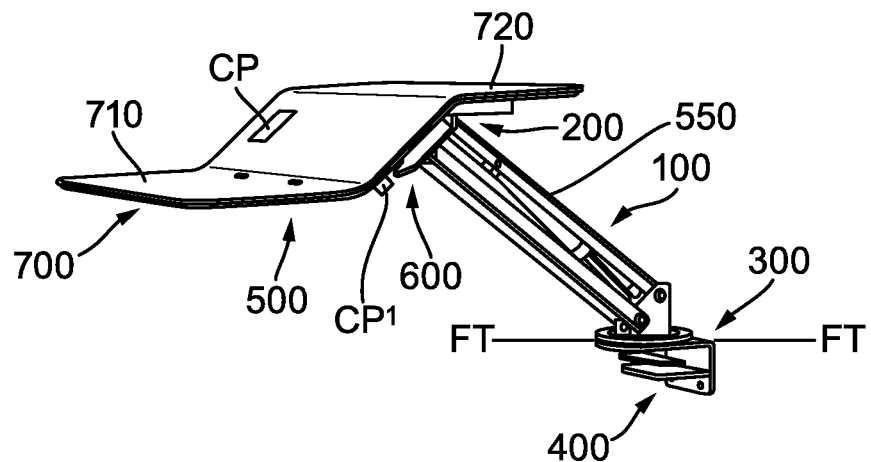
FIG. 1 shows a perspective view of a variable height workstation system in accordance with an embodiment of the present patent application.
Figure 2:
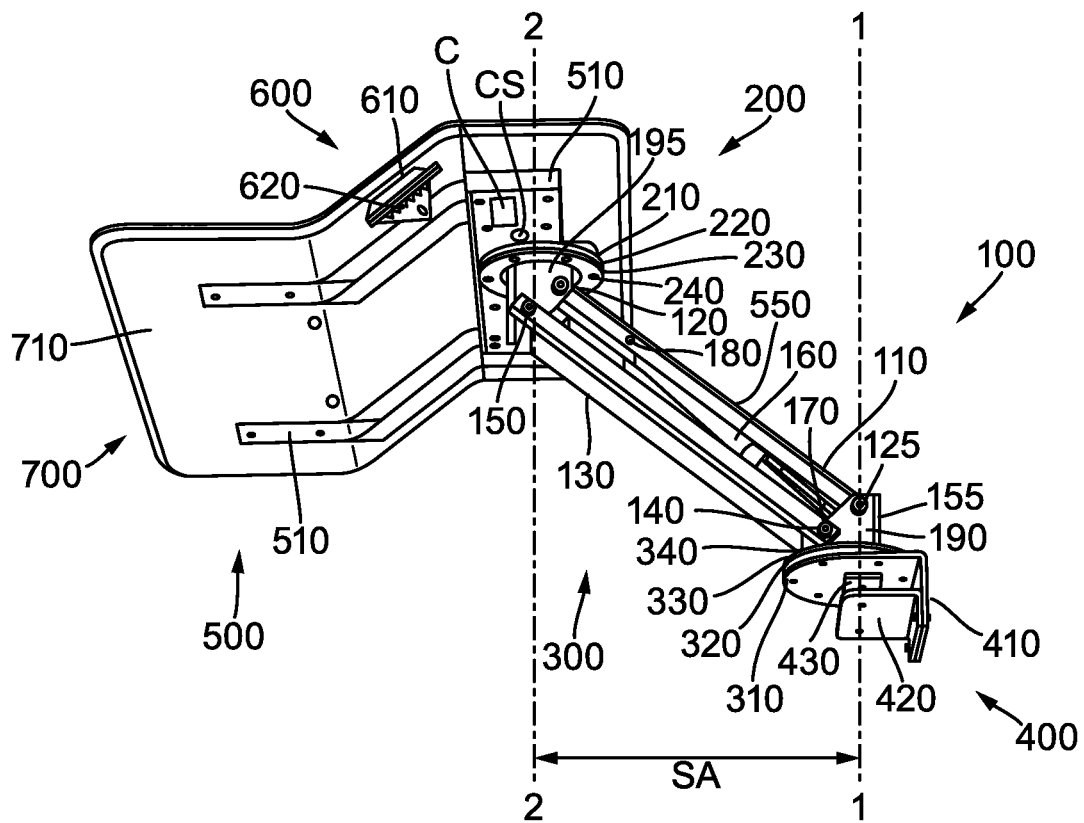
FIG. 2 shows another perspective view of the variable height workstation system in accordance with an embodiment of the present patent application.
Figure 3:
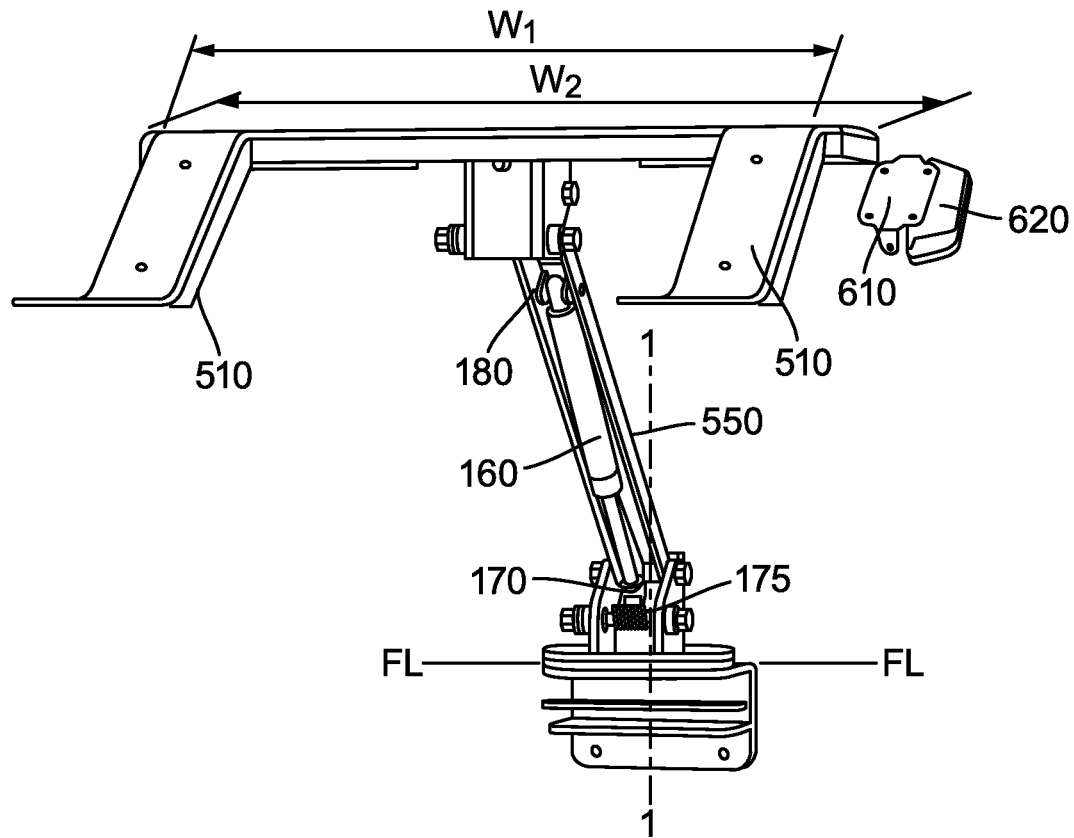
FIG. 3 shows another perspective view of the variable height workstation system in accordance with an embodiment of the present patent application, some components of the system are not shown to better illustrate other components and for sake of clarity.

Referring to FIGS. 1-3, a variable height workstation system 100 comprises a base 400, a variable height platform 700, a lift mechanism 550, a lower adjustable pivot assembly 300, and an upper adjustable pivot assembly 200. The base 400 is configured to be mounted to a support surface S (e.g., FIGS. 9-14). The lift mechanism 550 is configured to move the variable height platform 700 between a fully lowered position LP (e.g., see FIGS. 10 and 12) and a raised position RP (e.g., see FIGS. 9 and 11).

The lower adjustable pivot assembly 300 is configured to be connected to the base 400 and the lift mechanism 550. The lower adjustable pivot assembly 300 comprises a lower pivot member 310 configured to be rotated about a first vertical rotational axis 1-1. The lower adjustable pivot assembly 300 comprises a lower adjustable force regulator 340 configured to adjust a force required to rotate the lower pivot member 310 about the first vertical rotational axis 1-1. The upper adjustable pivot assembly 200 is configured to be connected to the lift mechanism 550 and the variable height platform 700. The upper adjustable pivot assembly 200 comprises an upper pivot member 210 configured to be rotated about a second vertical rotational axis 2-2 spaced from the first vertical rotational axis 1-1. The upper adjustable pivot assembly 200 comprises an upper adjustable force regulator 240 configured to adjust a force required to rotate the upper pivot member 210 about its second vertical rotational axis 2-2.

The lift mechanism 550, the lower adjustable pivot assembly 300 and the upper adjustable pivot assembly 200 of the variable height workstation system 100 are configured to maintain an essentially horizontal orientation of the variable height platform 700 between the fully lowered position LP and the raised position RP.

The variable height workstation system 100 is also referred to as multi-position articulating platform system or device. The variable height workstation system 100 overcomes many of the limitations of the current devices/systems and/or prior art devices/systems. For example, the present patent application endeavors to overcome the stability and work surface size limitations of the articulating arm type sit stand devices while keeping the flexibility to move and pivot the work surface that the larger units lack. Due to the robust construction and stability features, the present patent application may accommodate more weight and, therefore, a larger work surface than the typical modified monitor arm based sit stands.

The base 400, the lift mechanism 550, the variable height platform 700, the lower adjustable pivot assembly 300 and the upper adjustable pivot assembly 200 may be made of a metal (e.g., a steel, an aluminum, etc.) material. The base 400, the lift mechanism 550, the variable height platform 700, the lower adjustable pivot assembly 300 and the upper adjustable pivot assembly 200 may be made of a plastic material, a composite material, or any other suitable material or combination of materials having sufficient durability to permit the use the variable height workstation system 100 while maintaining structural stability of the variable height workstation system 100.

Figure 9:
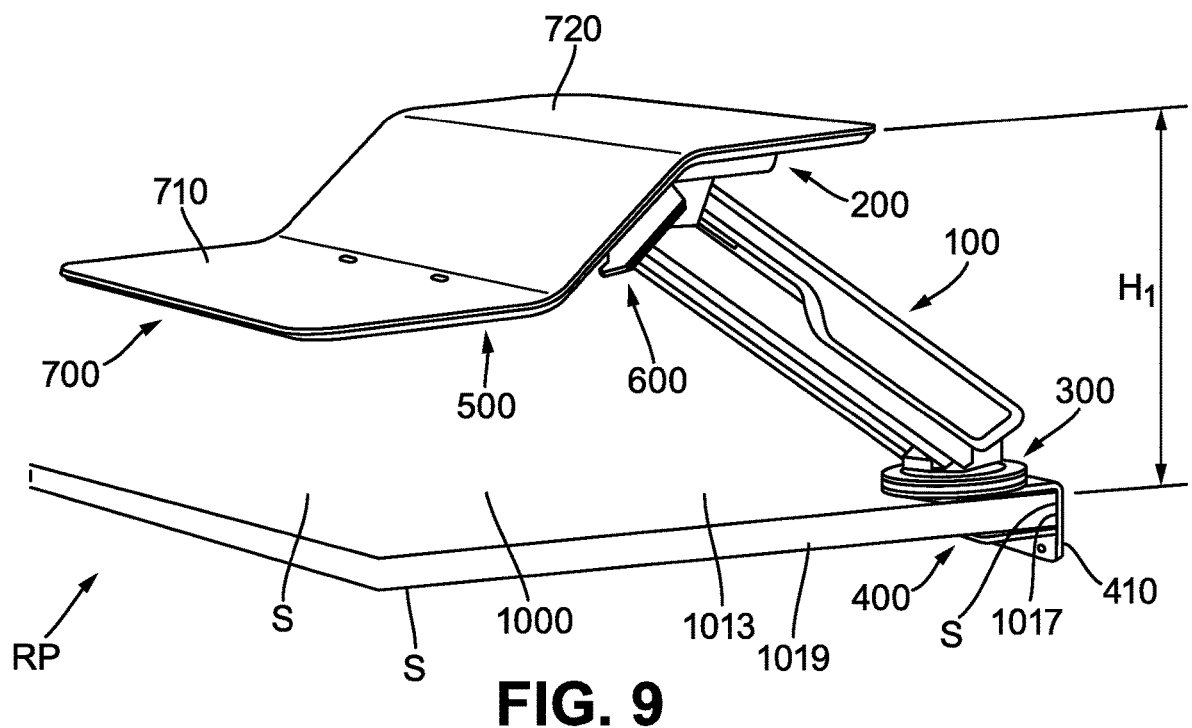
FIGS. 9 and 10 show perspective views of the variable height workstation system mounted to a table or desktop using a base (clamp assembly), where the variable height workstation system is in a raised position in FIG. 9 and the variable height workstation system is in a lowered position with a portion of a variable height platform assembly making contact with the table or desktop in FIG. 10, in accordance with an embodiment of the present patent application.
Figure 10:
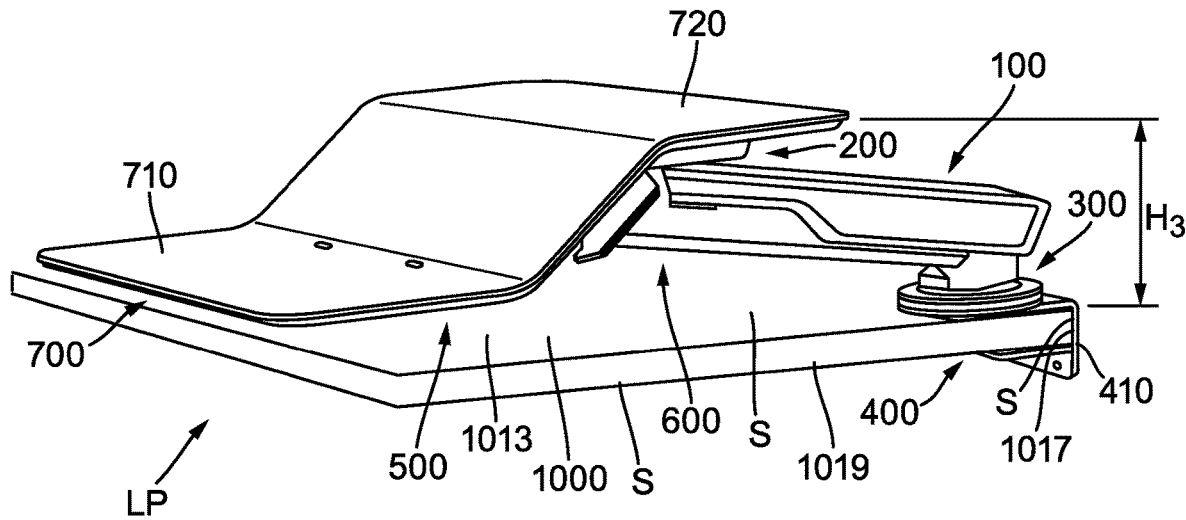
Figure 11:
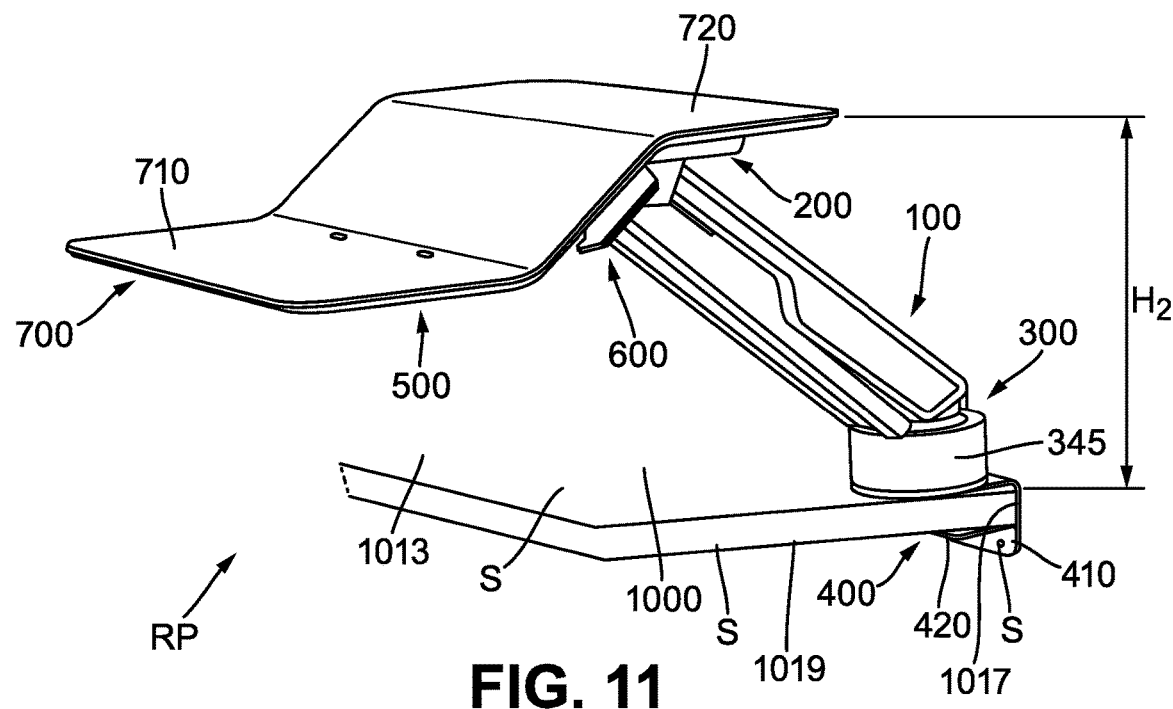
FIGS. 11 and 12 show perspective views of the variable height workstation system mounted to the table/desktop using the base (clamp assembly) with a clamp extension, where the variable height workstation system in a raised position in FIG. 11 and the variable height workstation system in a lowered position in FIG. 12, in accordance with another embodiment of the present patent application.

The variable height workstation system 100, in its fully raised position, has a height dimension $H_1$ that may generally range from about 20 inches to about 22 inches as shown in FIG. 9. The variable height workstation system 100, in its fully lowered position, has a height dimension $H_3$ that may generally range from about 4 inches to about 5 inches as shown in FIG. 10. The variable height workstation system 100, with a clamp extension 345 and in its fully raised position, has a height dimension $H_2$ that may generally range from about 20 inches to about 22 inches as shown in FIG. 11. The variable height workstation system 100, with the clamp extension 345 and in its fully lowered position, has a height dimension $H_4$ that may generally range from 2 inches to about 3 inches. For example, these height dimensions are measured from the top of a table desktop 1000 to a top surface of an upper platform 720 and when the variable height platform 700 of a thickness of 0.5 inches is being mounted on the variable height workstation system 100.

The variable height workstation system 100, without the variable height platform 700 mounted thereon, has width dimension $W_1$ that may generally range from about 12 inches to about 20 inches as shown in FIG. 3. The variable height workstation system 100, without the variable height platform 700 mounted thereon, has width dimension $W_2$ that may generally range from about 12 inches to about 20 inches as shown in FIG. 3. The variable height workstation system, without the variable height platform 700 supported thereon, may generally weigh from about 30 pounds to about 50 pounds.

The variable height workstation system 100 may also include a power switch and other electrical contacts for connecting a power cord from a source of electricity for operation of the variable height workstation system 100. Typically, the power supply will be a standard power cord with a plug on its end that plugs into a standard AC outlet.

The base 400 may be referred to as a base assembly, a base clamping assembly, or a base clamp assembly. The base 400 may be configured to prevent scratching of the support surface S, or increase friction on the support surface S to prevent shifting or sliding of the variable height workstation system 100 while in use. The base 400 may also include members that are configured to compensate for any unevenness of the support surface S and/or any misalignment of members of the lift assembly 550.

The base 400 is configured to be mounted to the support surface S (e.g., FIGS. 9-14). The base 400 may be either a clamp type base (as shown in FIG. 2) or a larger weighted base so as to ensure the stability of the variable height workstation system 100 throughout its entire movement range when placed on or mounted to the support surface S.

Figure 13:
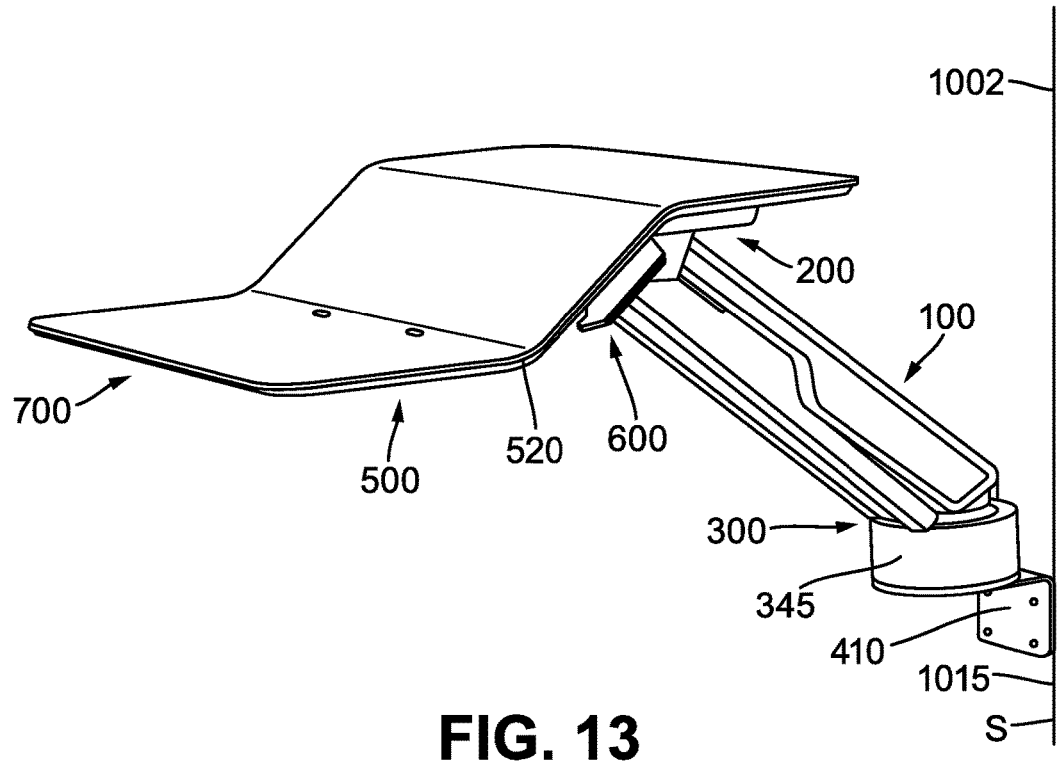
FIG. 13 shows a perspective view of the variable height workstation system in accordance with an embodiment of the present patent application, where the variable height workstation system is in a wall mounted configuration.
Figure 14:
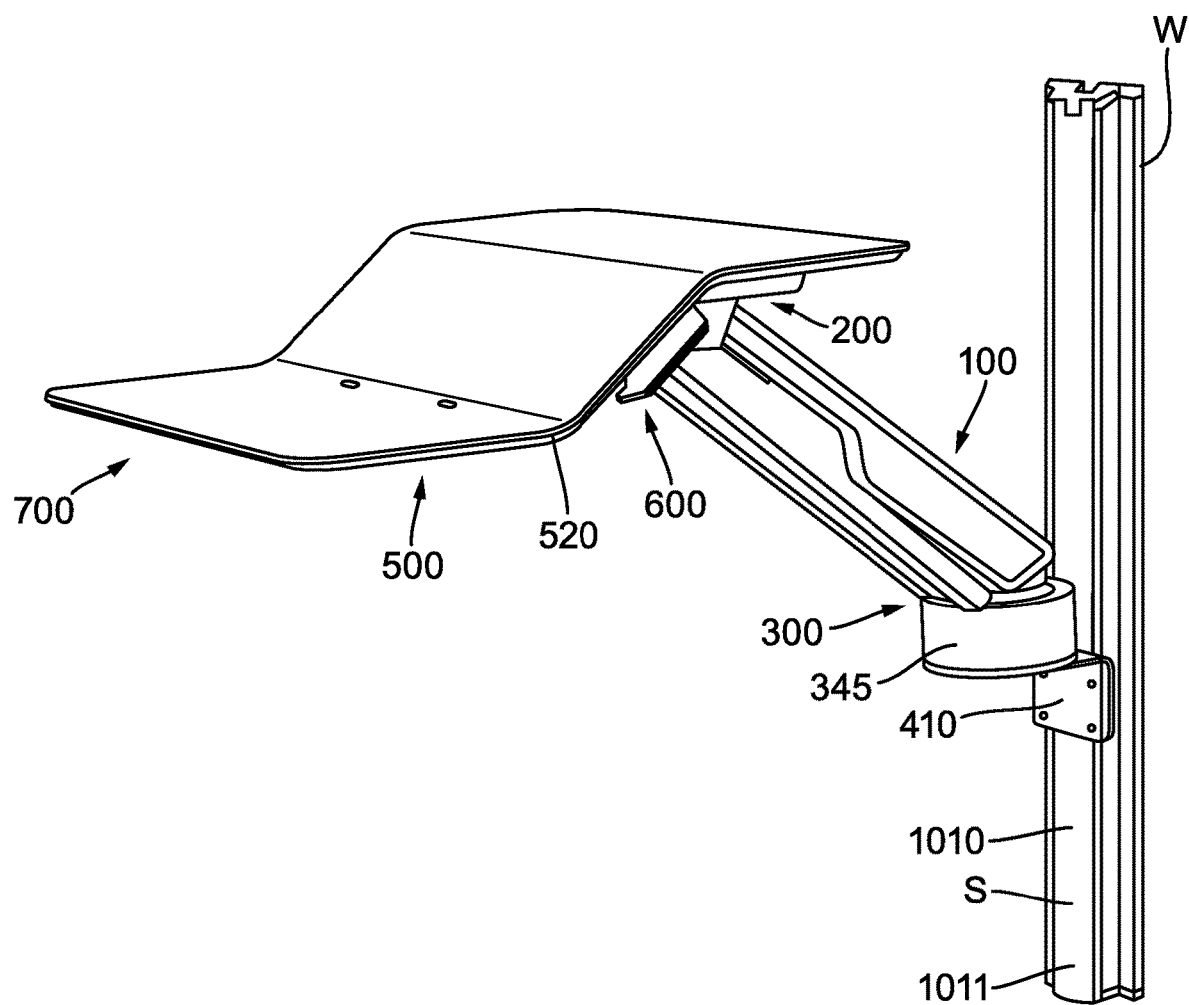
FIG. 14 shows a perspective view of the variable height workstation system in accordance with an embodiment of the present patent application, where the variable height workstation system is in a wall track mounted configuration.

The support surface S may include surfaces 1013, 1017 and/or 1019 of a table/desktop 1000 as shown in FIGS. 9-12. The support surface S may include a surface 1015 of a wall 1002 as shown in FIG. 13. The support surface S may include a surface 1011 of a mounting track 1010 as shown in FIG. 14. The base 400 is configured to removably or detachably mount the variable height workstation system 100 to the support surface S.

The base 400 is configured to attach the variable height workstation system 100 to the surfaces 1013, 1017 and/or 1019 of the table/desktop 1000. As shown in FIGS. 2 and 9-12, the base 400 includes a clamp base 410, a clamp support 420, and a clamp plate 430. For example, the clamp base 410 is configured to engage the side surface 1017 of the table/desktop 1000. The clamp support 430 and the clamp plate 420 are configured to engage the top surface 1013 and the bottom surface 1019 of the table/desktop 1000, respectively. The clamp base 410, the clamp support 420, and the clamp plate 430 of the base 400 together form a table/desktop receiving portion. As would be appreciated by skilled in the art, when the base clamp 400 is actuated, it causes the clamp support 420 and the clamp plate 430 to be drawn together securing a portion of the table/desktop 1000 therebetween and forcing the clamp plate 430 against the surface 1013 of the table/desktop 1000 so as to connect the base 400 and the table/desktop 1000.

In some embodiments, the clamp support 420 and the clamp plate 430 are optional. For example, when the variable height workstation system 100 is mounted to the wall 1002 as shown in FIG. 13 or to the mounting track 1010 as shown in FIG. 14, the base 400 may only include the clamp base 410. In such embodiments, the clamp base 410 is configured to engage and directly attach the variable height workstation system 100 to the wall 1002 as shown in FIG. 13 or to the mounting track 1010 as shown in FIG. 14.

The variable height workstation system 100 includes the upper adjustable pivot assembly 200 and the lower adjustable pivot assembly 300. The upper adjustable pivot assembly 200 may mirror the lower adjustable pivot assembly 300 in both construction and features. The upper adjustable pivot assembly 200 may differ from the lower adjustable pivot assembly 300 in both construction and features. Both the upper and lower adjustable pivot assemblies 200 and 300 may have force adjustment/regulator features that allow for separately operable and adjustable force settings. That is, the upper and lower adjustable pivot assemblies 200 and 300 are configured to be separately operable at different force settings from one another.

For example, when the upper and lower adjustable pivot assemblies 200 and 300 move at the same force setting, ambiguity may result and the operator may have difficulty actuating one pivot assembly over another (i.e., pivoting the entire arm system from the base 400 vs. rotating the upper work surface/platform 720). In one embodiment, one of the two adjustable pivot assemblies 200 and 300 is configured to operate at a varied force setting than the other of the two adjustable pivot assemblies 200 and 300 so as to eliminate the ambiguity and to ensure larger pivoting action (e.g., pivoting the entire arm system/assembly). As a result, the operator/user has the greatest advantage. As will be clear from the discussions below, this force adjustment feature may be accomplished by adjusting the assembly screws 340*a*/340*b* (see FIGS. 6*a* and 6*b*, described in detail below) on a pivot retainer collet 330. By tightening or loosening the screws 340*a*/340*b*, the force required to rotate the adjustable pivot assembly 200/300 may be varied.

Additionally, either the upper adjustable pivot assembly 200, the lower adjustable pivot assembly 300 or both can incorporate a leveling gimble assembly 337 and 315*a*/315*b* (see FIGS. 5*a* and 5*b* and described in detail below) to compensate for any manufacturing irregularities, assembly irregularities or mounting surface irregularities. The leveling gimble assembly 337 and 315*a*/315*b* may be set at the manufacturing facility/factory (where the variable height workstation system 100 is manufactured) using set screws, or may be modified by the operator of the variable height workstation system 100 using knurled knob screws. The leveling gimble assembly 337 and 315*a*/315*b* is configured to allow the variable height platform 700 to stay relatively horizontal to the surface S or 1013 on which the variable height workstation system 100 has been mounted to. These adjustable force settings, when adjusted or utilized, can regulate the horizontal planar movement of the work surface's orientation with respect to the mounted base.

Figure 4:
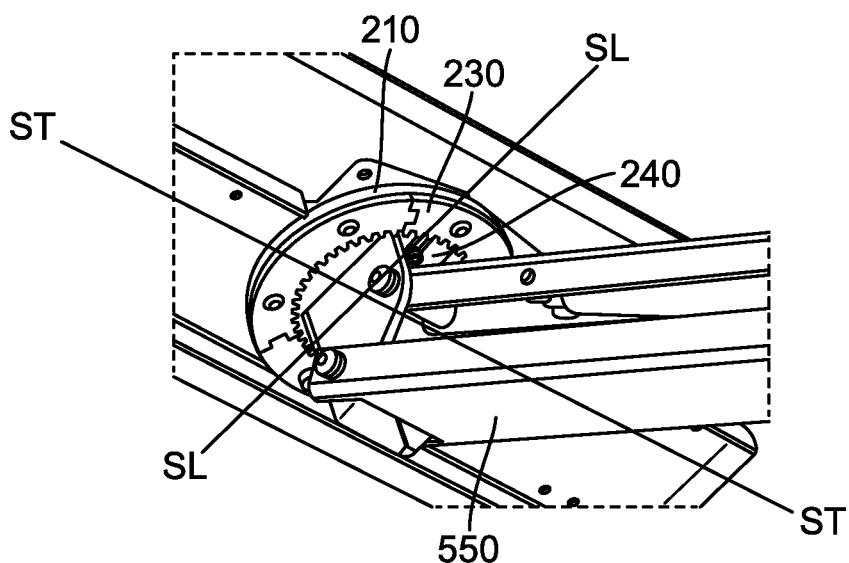
FIG. 4 shows a perspective, close-up view of one of two adjustable pivot assemblies in accordance with an embodiment of the present patent application.

As an alternative or supplemental feature, an actuation pin 351 (as shown in FIGS. 7*a* and 7*b* and described in detail below), cam, or gear (as shown in FIG. 4 and described in detail below) may be added to the upper and lower adjustable pivot assemblies 200 and 300 to adjust the resistance and/or to lock one, or both of the upper and lower adjustable pivot assemblies 200 and 300. This additional action can be accomplished remotely by way of an additional cable actuated lever assembly (e.g., 352 in FIGS. 7*a* and 7*b*).

In one embodiment, the lock/latch of the adjustable pivot assembly 200/300 is separate from their adjustable force regulator. For example, the adjustable force regulator is configured to control the amount of force required to move their respective pivot member. The lock is configured to either prevent or permit the movement of their respective pivot member.

The variable height workstation system 100 generally has two pivot points, one provided by the upper adjustable pivot assembly 200 and the other provided by the lower adjustable pivot assembly 300. The first pivot point has the first pivot axis or first vertical rotational axis 1-1 and the second pivot point has the second pivot axis or second vertical rotational axis 2-2. The configuration of the variable height workstation system 100 with two pivot points provides 180 degrees rotation per axis for the variable height workstation system 100, only limited by the use of an optional stop.

One of the two adjustable pivot assemblies 200 and 300 of the variable height workstation system 100 may operate as a primary pivot assembly, while the other of the two adjustable pivot assemblies 200 and 300 of the variable height workstation system 100 may operate as a secondary pivot assembly of the variable height workstation system 100.

The lower adjustable pivot assembly 300 is configured to be connected to the base 400 and the lift mechanism 550. The base 400 may include the lower adjustable pivot assembly 300.

Referring to FIG. 2, the upper parallel arm 110 of the lift mechanism 550 is connected at its lower end portion to a lower pivot attachment 190 using the upper parallel arm lower attachment 125. The lower parallel arm 130 of the lift mechanism 550 is connected at its lower end portion to the lower pivot attachment 190 using the lower parallel arm lower attachment 140. The lower pivot attachment 190 is connected to the lower adjustable pivot assembly 300. For example, the lower pivot attachment 190 is connected to the lower pivot member 310 of the lower adjustable pivot assembly 300 using welding or other attachments/attachment mechanisms as would be appreciated by one skilled in the art.

The lower adjustable pivot assembly 300 is configured to ensure stability and ease of movement by utilizing the large horizontally oriented pivot plate 310. The lower pivot member 310 of the lower adjustable pivot assembly 300 is configured to be rotated about the first vertical rotational axis 1-1. The lower pivot member 310 is also adjustably entrapped between pivot bearing surfaces 320 in contrast to the prior art examples that typically use pivot joints constructed from vertical tube-like structures being loosely fitted one inside of another.

The lower adjustable pivot assembly 300 also includes a retaining collet 330 and the lower adjustable force regulator/adjustment mechanism 340.

The retaining collet 330 is configured to hold the lower pivot member 310, which is adjustably entrapped between pivot bearing surfaces 320, in place in the lower adjustable pivot assembly 300. The retaining collet 330 may also be configured to engage or disengage with the lower adjustable force regulator 340, as will be clear from the discussions below with respect to FIGS. 5a-7b, so as to adjust the force required to rotate the lower pivot member 310 about the first vertical rotational axis 1-1. The retaining collet 330 is further configured to connect/attach the lower adjustable pivot assembly 300 to the base 400.

The lower adjustable force regulator 340 of the lower adjustable pivot assembly 300 is configured to adjust a force required to rotate the lower pivot member 310 about the first vertical rotational axis 1-1. The lower adjustable force regulator 340 may have many different configurations. The configurations of the lower adjustable force regulator 340 described, for example, with respect to FIGS. 5a to 7b, are just a few exemplary configurations. The present patent application contemplates other configurations, as would be appreciated by one skilled in the art, of the lower adjustable force regulator 340 as long as the lower adjustable force regulator 340 is configured to adjust a force required to rotate the lower pivot member 310 about the first vertical rotational axis 1-1. The configurations of the lower adjustable force regulator 340 described, for example, with respect to FIGS. 5a to 7b, may be applied to the upper adjustable pivot assembly 200.

Referring to FIGS. 6a and 6b, the lower adjustable force regulator 340 of the lower adjustable pivot assembly 300 includes adjusting/adjustment screws 340a and/or 340b. The lower adjustable force regulator 340 may include one or more adjustment screws. The adjustment screws 340a and/or 340b are configured to either exert/apply or loosen their respective engagement against the bearing surface 320 to adjust of the force required to rotate the lower pivot member 310 about the first vertical rotational axis 1-1. When the adjustment screws 340a and/or 340b loosen their respective engagement against the bearing surface 320, the force required to rotate the lower pivot member 310 about the first vertical rotational axis 1-1 is lower compared to when the adjustment screws 340a and/or 340b exert their respective engagement against the bearing surface 320. That is, when the adjustment screws 340a and/or 340b exert their respective engagement against the bearing surface 320, a higher force may be required to rotate the lower pivot member 310 about the first vertical rotational axis 1-1.

When the adjustment screws 340a and/or 340b exert their respective engagement against the bearing surface 320, the bearing surface 320 adjustably entraps the lower pivot plate 310 so as to adjust of the force required to rotate the lower pivot member 310 about the first vertical rotational axis 1-1. That is, tightening or loosening the adjustment screw 340a, while tightening or loosening the adjustment screw 340b causes the lower adjustable force regulator 340 to adjustably resist when the variable height workstation is being rotated about the first vertical rotational axis 1-1. This force adjustment mechanism 340, as described in FIGS. 6a and 6b, can optionally be applied to the upper adjustable pivot assembly 200.

The lower adjustable pivot assembly 300 includes a lower angle adjuster (e.g., gimble 337) configured to adjust an angle of the lower pivot member 310 about a first horizontal longitudinal axis FL-FL (as shown in FIG. 3) and/or about a first horizontal transverse axis FT-FT (as shown in FIG. 1).

Referring to FIGS. 5a and 5b, the lower adjustable force regulator 340 of the lower adjustable pivot assembly 300 includes adjustment screws 315a and/or 315b and an adjustment gimble 337. The adjustment gimble 337 is actuated by adjusting screws 315a and/or 315b that exert or loosen their respective engagement against the retaining collet 330. FIG. 5b shows a sequential illustration of the feature being adjusted. Tightening or loosening the screw 315a, while tightening or loosening the screw 315b causes the lower adjustable pivot assembly 300 to adjustably lean accordingly. This adjustment feature of the lower adjustable pivot assembly 300 provides, by the use of both the adjusting screws 315a and/or 315b and the adjustment gimble 337, angular adjustment of the lower pivot member 310 about the first vertical rotational axis 1-1 and adjustment of the force required to rotate the lower pivot member 310 about the first vertical rotational axis 1-1. This force adjustment mechanism, as described in FIGS. 5a and 5b, can optionally be applied to the upper adjustable pivot assembly 200.

The lower adjustable pivot assembly 300 includes a first actuator configured to actuate the lower adjustable force regulator 340 to adjust a force required to rotate the lower pivot member 310 about the first vertical rotational axis 1-1. The lower adjustable pivot assembly 300 also includes a first/lower lock configured to move the lower adjustable force regulator 340 between a lock position and a release position. When the lower adjustable force regulator 340 is in the lock position, the lower adjustable force regulator 340 does not adjust the force required to rotate the lower pivot member about the first vertical rotational axis 1-1. In another embodiment, the lower lock of the lower adjustable pivot assembly 300 is configured to move the lower adjustable pivot assembly 300 between a lock position and a release position. When the lower adjustable pivot assembly 300 is in the lock position, the lower pivot member 310 does not rotate about the first vertical rotational axis 1-1.

FIG. 7a shows a side view of the lower adjustable force mechanism 340 that is remotely actuated by pulling the remote first lever (not shown). The remote lever/actuator is configured to pull a cable 352 upwards and loosen pin 351 force engagement against the bearing surface 320. Optionally, the pin 351 can engage into the pivot plate 320 to act as an engageable stop. FIG. 7b shows a sequential illustration of the operation of this force adjustment mechanism 340. For example, the figure on the left side of FIG. 7b shows the force adjustment mechanism 340 being engaged to adjustably resist when the variable height workstation is being rotated about the first vertical rotational axis 1-1, while the figure on the right side of FIG. 7b shows the force adjustment mechanism 340 being disengaged. This force adjustment mechanism, as described in FIGS. 7a and 7b, can optionally be applied to the upper adjustable pivot assembly 200.

The upper adjustable pivot assembly 200 is configured to be connected to the variable height platform 700 and the lift mechanism 550. Referring to FIG. 2, the upper parallel arm 110 of the lift mechanism 550 is connected at its upper end portion to an upper pivot attachment 195 using the upper parallel arm upper attachment 120. The lower parallel arm 130 of the lift mechanism 550 is connected at its upper end portion to the upper pivot attachment 195 using the lower parallel arm upper attachment 150. The upper pivot attachment 195 is connected to the upper adjustable pivot assembly 200. For example, the upper pivot attachment 195 is connected to the upper pivot member 210 of the upper adjustable pivot assembly 200 using welding or other attachments/attachment mechanisms as would be appreciated by one skilled in the art.

The upper adjustable pivot assembly 200 is configured to ensure stability and ease of movement by utilizing the large horizontally oriented pivot plate 210. The upper pivot member 210 of the upper adjustable pivot assembly 200 is configured to be rotated about the second vertical rotational axis 2-2 spaced (e.g., by a distance SA as shown in FIG. 2) from the first vertical rotational axis 1-1. The first vertical rotational axis 1-1 and the second vertical rotational axis 2-2 are generally parallel to each other. The upper pivot member 210 is also adjustably entrapped between pivot bearing surfaces 220 in contrast to the prior art examples that typically use pivot joints constructed from vertical tube-like structures being loosely fitted one inside of another.

The term "vertical rotational axis" as used herein may include an axis that is generally parallel to a vertical axis (e.g., an axis perpendicular to the surface S/1013 of the table/desktop 1000 or the ground surface/floor) and is within about 5° (degrees) or about 10° of the vertical axis. In some embodiments, the vertical rotational axis is within the range of +/−5° to 20° of the vertical axis. In some embodiments, the vertical rotational axis is within +/−10° of the vertical axis.

The upper adjustable pivot assembly 200 also includes a retaining collet 230 and the upper adjustable force regulator/adjustment mechanism 240. The retaining collet 230 is configured to hold the upper pivot member 210, which is adjustably entrapped between pivot bearing surfaces 220, in place in the upper adjustable pivot assembly 200. The retaining collet 230 may also be configured to engage or disengage with the upper adjustable force regulator 240, as will be clear from the discussions below, so as to adjust the force required to rotate the upper pivot member 210 about the second vertical rotational axis 2-2. The retaining collet 230 is further configured to connect/attach the upper adjustable pivot assembly 200 to the variable height platform 700 (e.g., using the variable height platform support/mount 510). The upper adjustable pivot assembly 200 may be attached by way of a mounting bracket to the variable height platform 700.

The upper adjustable force regulator 240 of the upper adjustable pivot assembly 200 is configured to adjust a force required to rotate the upper pivot member 210 about the second vertical rotational axis 2-2. The upper adjustable force regulator 240 may have many different configurations. The configurations of the adjustable force regulator described, for example, with respect to FIGS. 5*a*-7*b*, may be used for the upper adjustable force regulator 240. The present patent application contemplates other configurations, as would be appreciated by one skilled in the art, of the upper adjustable force regulator 240 as long as the upper adjustable force regulator 240 is configured to adjust a force required to rotate the upper pivot member 210 about the second vertical rotational axis 2-2.

Referring to FIG. 4, the upper pivot member 210 is shown with one of the described embodiments for the upper adjustable force regulator 240. The upper adjustable force regulator 240 includes a toothed gear that can be engaged and disengaged with the retaining collet 210 having the matching gear tooth pattern. The upper adjustable force regulator 240 may be adjusted by way of a tension spring and dampen collet to add adjustable force to the rotating toothed gear. As the upper pivot member 210 rotates, the upper adjustable force regulator 240 engages with the retainer collet 230's matching gear tooth so as to engage and rotate as well exerting the adjusted level of variable resistance when the variable height workstation system 100 is pivoted (e.g., about the second vertical rotational axis). Optionally, the gear can be engaged and disengaged by way of an actuation lever and cable mechanism (not shown). This force adjustment mechanism, as described in FIG. 4, can optionally be applied to the lower adjustable pivot assembly 300.

The upper adjustable pivot assembly 200 may include a second lock configured to move the upper adjustable force regulator 240 between a lock position and a release position. When the upper adjustable force regulator 240 is in the lock position, the upper adjustable force regulator 240 does not adjust the force required to rotate the upper pivot member 210 about the second vertical rotational axis 2-2. In another embodiment, the second/upper lock of the upper adjustable pivot assembly 200 may be configured to move the upper adjustable pivot assembly 200 between a lock position and a release position. When the upper adjustable pivot assembly 200 is in the lock position, the upper pivot member 210 does not rotate about the second vertical rotational axis 2-2. The lock, when actuated/locked, is configured to enable the user to move the lower adjustable pivot assembly 300 easily and freely with a single-handed operation. That is, without the lock of the upper adjustable pivot assembly 200 being actuated, the user may need to use both his hands to operate the lower adjustable pivot assembly 300.

The upper adjustable pivot assembly 200 includes a second actuator configured to actuate the upper adjustable force regulator 240 to adjust a force required to rotate the upper pivot member 210 about the second vertical rotational axis 2-2.

The upper adjustable pivot assembly 200 includes an upper angle adjuster (e.g., gimble 337) configured to adjust an angle of the upper pivot member 210 about a second horizontal longitudinal axis SL-SL (as shown in FIG. 4) and/or about a second horizontal transverse axis ST-ST (as shown in FIG. 4).

The lower adjustable pivot assembly 300's and the upper adjustable pivot assembly 200's force regulator/adjustment feature may be set at a manufacturing facility/factory (where the variable height workstation system 100 is manufactured) using set screws. The lower adjustable pivot assembly 300's and the upper adjustable pivot assembly 200's force regulator/adjustment feature may be modified by the operator of the variable height workstation system 100 using knurled knob screws. The lower adjustable pivot assembly 300's and the upper adjustable pivot assembly 200's force regulator/adjustment feature may be remotely actuated the operator by way of a flex cable and handle arrangement or an actuator.

The lower adjustable pivot assembly 300 and the upper adjustable pivot assembly 200 may be motor assisted to enable their movement. The variable height workstation system 100 may also include a built-in power supply that is configured to power the lower adjustable pivot assembly 300 and the upper adjustable pivot assembly 200. Also, the lower adjustable pivot assembly 300 and the upper adjustable pivot assembly 200 may be in communication with a sensor and the controller C of the variable height workstation system 100. The controller C is configured to receive the sensor data and operate the lift mechanism 550, the lower adjustable pivot assembly 300 and/or the upper adjustable pivot assembly 200 based on the sensor data. The controller may optionally compare the sensor data with its corresponding predetermined threshold. The controller C, based on the comparison of the sensor data with its corresponding predetermined threshold, is configured to operate the lift mechanism 550, the lower adjustable pivot assembly 300 and/or the upper adjustable pivot assembly 200.

Figure 12:
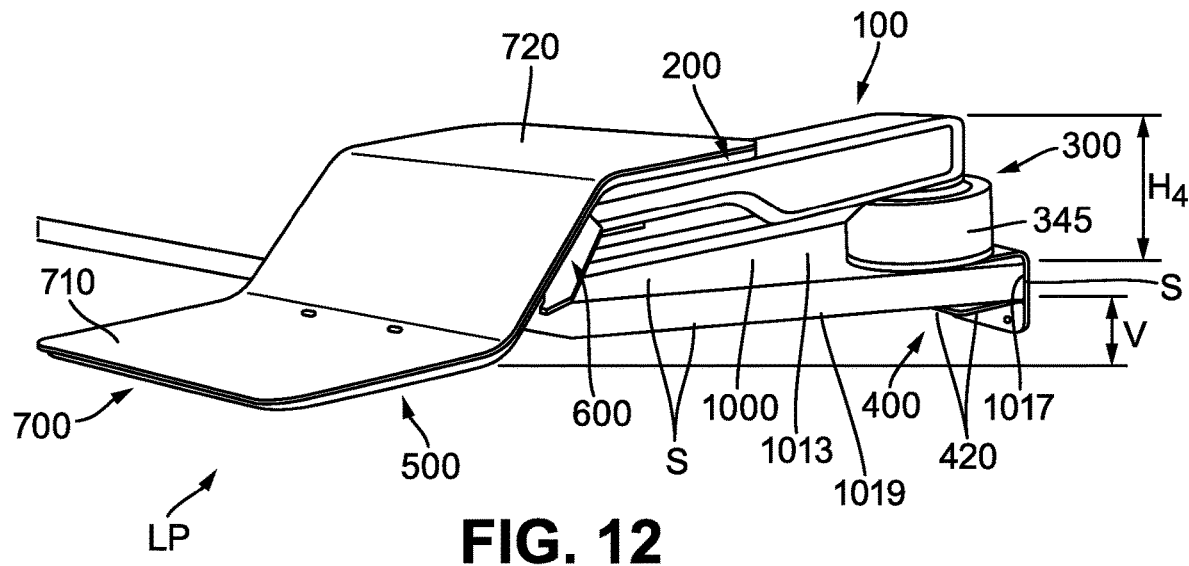

The lift mechanism 550, the lower adjustable pivot assembly 300 and the upper adjustable pivot assembly 200 are configured to move the variable height platform 700 within a range of motion between a fully lowered position LP (as shown in FIGS. 10 and 12) and a raised position RP (as shown in FIGS. 9 and 11). In one embodiment, the raised position RP may be a fully raised position. In one embodiment, the raised position may be an intermediate position between the fully lowered position LP and the fully raised position. The variable height platform 700 may include one or more intermediate positions between the fully raised position and the fully lowered position.

The variable height workstation system 100 may include a lock or latch mechanism that allows the user to lock the lift assembly 550, and the upper and lower adjustable pivot assemblies 300 and 200 such that variable height platform 700 is maintained in each of these various vertical positions (including the raised position, the fully raised position, the fully lowered position, and/or one or more intermediate positions). The variable height workstation system 100 may have an actuator that is easily accessible to the user/operator to operate this lock.

The term "essentially" as used herein to indicate that the variable height platform 700, at least during use, is generally parallel to a horizontal surface (e.g., surface S or 1013 of the table/desktop 1000 or the ground surface/floor (e.g., in a wall mounted configuration or a wall track mounted configuration)) and is within about 5° (degrees) or about 10° of the horizontal surface. In some embodiments, the variable height platform 700, at least during use, is within the range of +/−5° to 20° of the horizontal surface. In some embodiments, the variable height platform 700, at least during use, is +/−10° of the horizontal surface. For example, the variable height platform 700 includes an upper platform 720 and a lower platform 710. The upper and lower platforms 720 and 710 of the variable height platform 700 are maintained in the essentially horizontal orientation between the fully lowered position LP and the raised position RP of the variable height platform 700.

The variable height platform 700 is in its horizontal orientation (e.g., is parallel to the horizontal surface (e.g., surface S or 1013 of the table/desktop 1000 or the ground surface/floor)) when the variable height platform 700 is in the fully lowered position LP, in the fully raised position, in the raised position RP, or in any intermediate position therebetween.

In its fully lowered position LP, the variable height platform 700 (e.g., the lower platform 710) may be placed onto the surface S or 1013 of the table/desktop 1000 as shown in FIG. 10. In its fully lowered position LP, the variable height platform 700 700 (e.g., the lower platform 710) may be placed below the surface S or 1013 of the table or desktop 1000 as shown in FIG. 12. The operator in the sitting position would utilize in the variable height platform 700 in its fully lowered position LP.

In the raised position RP, the lower platform 710 of the variable height platform 700 is set at a height that is optimal for the operator.

The lift mechanism/lift arm assembly/lift assist assembly 550 includes a parallel or four bar arm type lift mechanism. The lift mechanism 500 (in combination with the lower and upper adjustable pivot assemblies 300 and 200) ensures, when raising and lowering the variable height platform 700, that the variable height platform 700 stays parallel to the surface S (e.g., surface 1013 of the table/desktop 1000) that the variable height workstation system 100 has been mounted to.

The lift mechanism 550 may include a plurality of articulated or leg members 110, and 130. In one embodiment, the number of articulated or leg members may vary. The leg members may have channel (e.g., U-shaped channel) shaped cross-sectional configuration or shaped configurations as would be appreciated by one skilled in the art. The lift mechanism 550 may also be configured to include cord/cable/wire management capabilities/assembly for accommodating power and/or communication cables (e.g., such as USB cables/wire, power cables/wires, and phone cables/wire, or any other additional cables/wires) for electronic or electrical devices that are placed on the variable height platform 700.

Referring to FIG. 3, the lift mechanism 550 includes a gas/pneumatic spring 160 that is mounted on one end to the upper arm 110 and the other end by way of a slideably adjustable mount within the lower adjustable pivot assembly 300. That is, the gas spring 160 is mounted to the slideably adjustable mount within the lower adjustable pivot assembly 300 using a gas spring lower attachment 170 and is attached/mounted to the upper parallel arm 110 by way of a gas spring upper attachment 180. The gas spring lower attachment 170 uses a sliding screw drive attachment (not shown) to adjust the force level of the lift mechanism 550. The gas spring 160 may be a pneumatic mechanism or pressurized gas mechanism. The gas spring 160 may be a pneumatic cylinder assembly (i.e., gas charged piston).

The gas spring 160 of the lift mechanism 550 is actuated by an actuation lever 620 that is mounted to the variable height workstation system 100 (e.g., on variable height platform support 510) using an actuation lever mount 610. The actuation lever 620 is operatively connected by a cable wire to a gas spring actuator (not shown) and the gas spring 160. The gas spring may optionally include a sliding nut that is configured to alter the maximum/minimum length of the gas spring. In another embodiment, the lift mechanism 550 may include a hydraulic mechanism, or mechanical mechanism (e.g., screw shaft assembly) for operating the lift mechanism 550 to facilitate the movement of the variable height platform 700 between the full lowered position LP and the raised position RP.

The gas spring 160 may be replaced by a linear actuator motor assembly if a motorized powered version of the variable height workstation system 100 is used. The motorized embodiment of the variable height workstation system 100 is powered by way of a power board, and a controller C (as shown in FIG. 2), reacting to inputs from control panels, which send power and signals to a motor. The motor may be a brushless DC motor. In other embodiments, the variable height workstation system 100 includes a battery operated motor or other mechanisms that are configured to provide power to operate the lift mechanism 550. The motor is configured to rotate a drive shaft (e.g., threaded screw). The lift mechanism 550 may also include gears and pinions to connect the motor output shaft to the drive shaft. The motor assembly may be disposed on the base 400 and/or the lower adjustable pivot assembly 300. The drive shaft may be operatively connected to the lift assembly 550 (e.g., upper parallel arm 110). The movement of the drive shaft facilitates the movement of the variable height platform 700 between the full lowered position LP and the raised position RP.

The variable height workstation system 100 may also include a built-in power supply that is configured to power the lift mechanism 550. Also, as will be described below, the lift mechanism 550 may be in communication with a sensor (e.g., sensor CS shown in FIG. 2 or other sensors) and a controller C (as shown in FIG. 2) of the variable height workstation system 100. The controller C is configured to receive the sensor data and compare the sensor data with its corresponding predetermined threshold. The controller C, based on the comparison of the sensor data with its corresponding predetermined threshold, is configured to operate the lift assembly 550 to facilitate the movement of the variable height platform 700 between the full lowered position LP and the raised position RP.

In addition, the lift mechanism 550 may also include a secondary force assist to aid the primary gas spring's functional range so as to ensure when lifting/raising and lowering the variable height platform 700, the operator is using a similarly constant lifting/raising and lower force throughout the entire range of movement. The variable height workstation system 100 includes a secondary lift assist device (e.g., a torsion spring) 175 as shown in FIG. 3. The secondary lift assist device 175 is configured to function/operate when the lift mechanism 550 is in the fully lowered position as to aid in the initial lifting of the lift mechanism 550.

The upper portion of the lift mechanism 550 is attached using the upper pivot attachment 195 to the (an additional) upper adjustable pivot assembly 200. The lower portion of the lift mechanism 550 is attached using the lower pivot attachment 190 to the lower upper adjustable pivot assembly 200.

To move the variable height platform 700 up and down, the actuator lever 620 is located advantageously so as to allow the operator to place the hand on variable height platform 700 and pull back the actuator lever 620 to actuate the gas spring mechanism 160 by way of a cable assembly. The actuator lever 620 is configured to pull the cable through the assembly activating the gas spring actuator 160. The gas spring 160 is of the type that automatically locks in place when the actuator lever 620 is returned to the non-actuated position. This allows the variable height platform 700 to be actuated, moved and stopped and subsequently lock in place anywhere vertically within its range of movement.

The variable height workstation system 100 may be mounted to the table/desktop 1000 using the base 400. FIGS. 9 and 10 show perspective views of the variable height workstation system 100 mounted to the table/desktop 1000 using the base 400, where the variable height workstation system 100 is in the raised position in FIG. 9 and is in the fully lowered position with the variable height platform 700 (i.e., lower platform 710) making contact with the table/desktop 1000 in FIG. 10.

The variable height workstation system 100 may be mounted to the table/desktop 1000 using the base 400 and a clamp extension 345. The clamp extension 345 is configured to allow the lower adjustable pivot assembly 300 to reside higher off the table/desktop 1000. Comparing FIGS. 10 and 12 clearly shows that the higher configuration of the lower adjustable pivot assembly 300 allows the lift mechanism 550 to pivot below a horizontal plane when activating the actuator 600. This configuration (e.g., in the lowered position of the variable height workstation system 100) allows the variable height platform's lower surface 710 to emulate the position of a keyboard tray like product, which is typically mounted below the table or desktop 1000's work surface S or 1013. This configuration has known advantageous and ergonomic benefits for the user. In this configuration, a lower surface of the lower platform 710 is spaced below a lower surface of the clamp support 420 by a vertical dimension V in the range of 0 inches and 3 inches. That is, the variable height platform 700 mounted to the variable height workstation system 100 may have a below work surface height V of about 0 inches to 3 inches as shown in FIG. 12. FIGS. 11 and 12 show perspective views of the variable height workstation system 100 mounted to the table/desktop 100 using the base 400 and the clamp extension 345, where the variable height workstation system 100 is in the raised position in FIG. 11 and the variable height workstation system 100 is in the lowered position in FIG. 12.

FIG. 13 shows a perspective view of the variable height workstation system 100, where the variable height workstation system 100 is in a wall mounted configuration. For example, a wall bracket mount 410 is used to mount the variable height workstation system 100 to a wall W. The wall bracket cover is not shown for sake of clarity.

FIG. 14 shows a perspective view of the variable height workstation system 100, where the variable height workstation system 100 is in a wall track mounted configuration. The wall/track mount bracket 410 is used to mount the variable height workstation system 100 to a mount track 1010. This allows for the variable height workstation system 100 to be raised and lowered by way of the mount track 1010 for additional articulating, and positioning benefits. The mount track 1010 can be mounted to the wall W, as shown. The mount track 1010 may be a column with a base (e.g., with and without casters) so as to allow the entire assembly to be moved easily from place to place. The wall/track mounting bracket cover is not shown for sake of clarity.

As clear from the discussions below with respect to FIGS. 15-18, the variable height platform 700 of the variable height workstation system 100 is configured to provide a large work surface with advanced power and sensor technologies.

The variable height platform 700 is configured to move up and down along a vertical axis (e.g., the first vertical rotational axis 1-1 or an axis parallel to the first or the second vertical rotational axis). The lift mechanism 550 of the variable height workstation system 100 is configured to provide this up and down movement of the variable height platform 700. The variable height platform 700 also is configured to move side to side along a horizontal axis at any vertical height position. The upper and lower adjustable pivot assemblies 200 and 300 are configured to provide this side-to-side movement of the variable height platform 700.

The variable height platform 700 is mounted to the variable height workstation system 100. For example, the variable height platform 700 is connected to (by any attachment/fastener mechanism as would be appreciated by one skilled in the art) the variable height platform support 510 as shown in FIGS. 2 and 3. The variable height platform support 510 also allows the variable height platform 700 to be easily reconfigurable to the operators specialized needs (such as a larger platform) or to fit within an office décor (e.g., shape, color or material).

Referring to FIGS. 15-18, the variable height platform/work platform assembly 700 includes two primary work platforms 710 and 720 that are connected together by a backstop/intermediate member 730. The upper work surface/platform 720 is designed to be raised above the lower work surface/platform 710 so as to function like a monitor stand and provide the operator an ergonomic advantage over an entirely flat surfaced sit stand device.

The lower work surface 710 may be optimally configured to hold input devices, shown as a standard keyboard and mouse. If these are corded input devices, the cords of these devices and any other additional cords such as USB cords and phone charge cords may be routed through opening(s) of the variable height platform 700. The upper work surface 720 may hold standard monitors that are secured to its surface with fasteners (not shown). The upper and lower work surfaces 710 and 720 are may also be configured to receive user's documents thereon.

Figure 15:
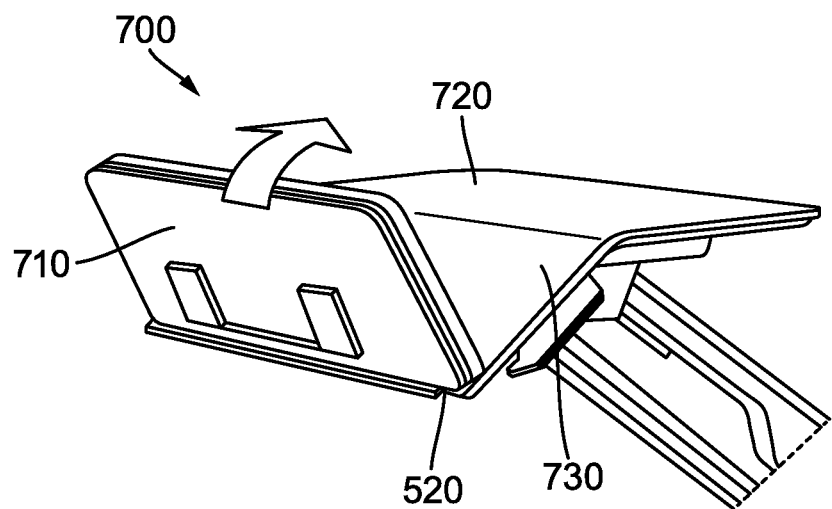
FIG. 15 shows a perspective view of the variable height workstation system in accordance with an embodiment of the present patent application, where a variable height platform is configured in a manner to allow a lower platform to move out of the way so as to save space when placed into a non-use stored position or when only one of the work platform's surfaces is needed.

As shown in FIG. 15, the variable height workstation system 100 is configured to allow the lower work platform 710 to move out of the way to pivot upwards by way of a hinge 520 so as to save space when the variable height workstation system 100 is placed into a non-use stored position or when only one of the work platforms (e.g., 720) is needed. For example, the lower platform 710 is configured to be folded onto the backstop transition 730 along an edge between the backstop transition 730 and the lower platform 710. This configuration of the lower platform 710 allows the entire assembly (e.g., 550, 200, 300) when lowered and retracted to fit under the raised upper area (e.g., 720 or 720/730), for example, see FIG. 18 and its related description below.

The backstop transition or step 730 is specifically designed to allow technology devices such as cell phones and tablets to functionally lean up against the backstop 730 at an advantageous viewing and operational angle. The angle of the backstop step 730 is configured to allow for an easy access to the integrated and modularly optional powered USB charging sockets, USB connectors, docking accessories, power sockets, and even accommodate wireless charging modules for wireless charging of mobile phones and tablets without the need of an additional stand device. The modularity of the powered backstop 730 is addressed by the above.

Figure 16:
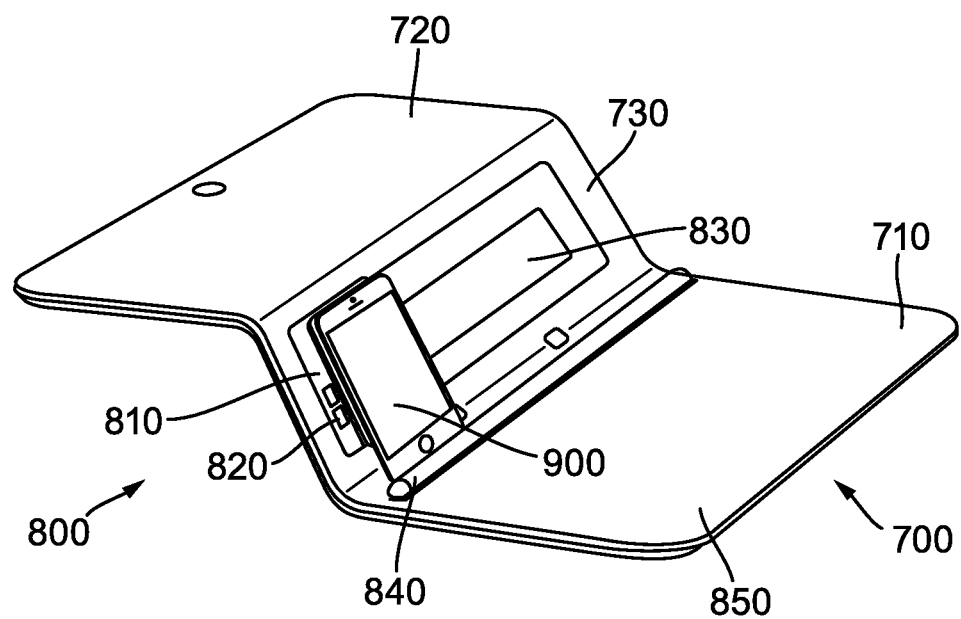
FIGS. 16 and 17 show perspective views of the variable height workstation system in accordance with an embodiment of the present patent application, where the variable height workstation system includes additional features for electronic accessories.
Figure 17:
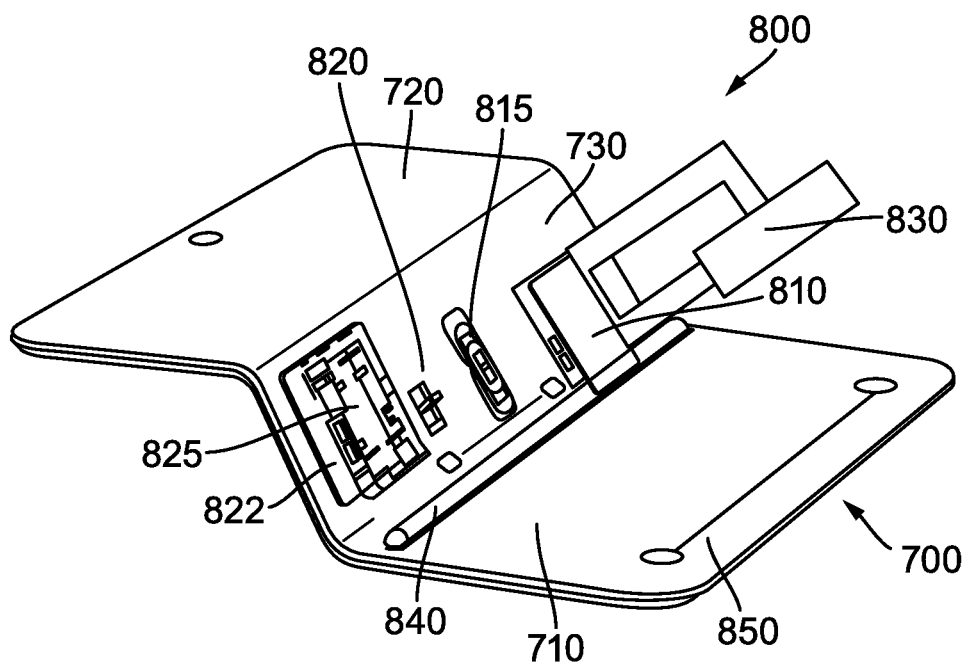

FIGS. 16 and 17 show perspective views of the variable height platform 700 with additional features and housing allowing for electronic accessories. Electronic powered features 800 may be applied to sit stand devices, in general, but optimally to sit stand devices that have the upper section/work surface 720 and the lower section/work surface 710 with the transitioning backboard/backstop 730 as shown.

A wireless charger 810 may be added to the backboard 730, for example, without the need for any additional device holding stand. That is, the backboard feature 730 in combination with a retaining bumper 840 of the platform assembly 700 is configured to create proper positioning for a wireless charging antenna that is configured to engage with a portable electronic device 900. A Universal Serial Bus (USB) charging port/hub 820 may be optionally added and easily accessible due to the convenient backboard 730 mounting.

In one embodiment, a "smart" platform device with the integrated surface movement detection is disclosed in the present patent application. A work surface of the device has the capability to detect movement upon and over it and the active use of objects across it. This is achieved through the device's ability to detect body and object movement on the primary work surface of the device, through a control means which can determine when to suggest to a user (e.g., by visual and audio means), to become more active and alternatively to become less active. This device may take these detected movements upon and above the primary work surface and by the use of the control means, determine which automatic suggestions to output to the user for the given device configuration and a given situation along with the user's setting and preferences. This "smart" platform device suggests the user to raise one's activity level, to move, to raise the work surface and/or to walk around. Alternatively, this "smart" platform device may suggest the user to lessen activity, to rest, to lower the work surface and to sit while working. This work surface can also be actuated by way of an integrated motor so as to use the inputs of integrated surface movement sensors and the control means to determine which automatic suggestions (e.g., visual and audio means) and/or mechanized movements to output to the user for the given device configuration and situation while taking into consideration the user's settings and preferences.

A capacitive sensing activity sensor may be added to sense actual human movement across at least two sensing/sensor zones on the platform assembly 700 (including the work platforms 710 and 720 and the backstop 730) more accurately sense and compile actual usage and interaction with the sit stand device. For example, a capacitive sensor arrangement 850 that is configured to sense human movement across its sensor zone(s) is shown in FIG. 16. This type of sensing may be applied to, embedded within, or mounted to the underside of most non-conductive surfaces. This feature is not limited to this type of sit stand but may be applied expansively to where tracking proximal movement near or across a surface can be advantageously applied. The capacitive sensor arrangement 850 is configured to sense human movement above, below and across its sensor zone(s). This type of sensor arrangement can be applied to, embedded within, or mounted to the underside of most non-conductive surfaces.

The signals from the capacitive sensor arrangement 850 are transmitted to a processor that initiates a timer based off the received signal(s). The capacitive sensor arrangement 850 is also interconnected to the PCB 825, which in turn receives the sensor signals and process them per a predetermined code so as to output the data to activate a signal to the operator when they should sit, stand and lower or raise the device per the user determined and inputted preferences. The data from the capacitive sensor arrangement 850 may be stored and may be accessed by way of an application or transmitted by WI-FI or Bluetooth or NFC type means to a mobile device and or cloud.

Referring to FIG. 17, an expansion panel 830 configured to allow for any future upgrades such as Infrared (IR) based activity tracking, digital readout, speaker, headset amplifier plug, personal and localized air treatment device, and cord management access like features can be added to the backstop 730. This feature list is not meant to be limiting in any way, only a few of many possible accessories that can be incorporated (i.e., either as a factory installed option or modularly added by the consumer after the initial purchase of the sit stand device) into the platform assembly 700 are listed here.

Referring to FIG. 17, an accessory housing 822 is secured to the platform assembly 700's transitioning wall 730, for example, by way of a press or snap fit, screw, or industrial adhesive tape or any combination thereof. Power to operate the accessories may be routed through the accessory housing 822. The Printed Circuit Board (PCB) 825 contains the hardware including an Integrated Circuit (IC) and processors. The PCB 825 is configured to control the designated accessories such as the USB hub 820. The USB hub 820 can be used to power electronic devices and, optionally, port data as well.

The wireless charging antenna 815 can be integrated within the accessory housing 822 and interconnected to the PCB 825 so as to wirelessly charge an electronic accessory. The electronic accessory is configured and tuned to a pairing protocol while making proper contact with a front portion 810 of the accessory housing 822. Future upgrades can be added to the work platform assembly 700 by removing the expansion panel 830, inserting and activating the accessory and either re-apply the expansion panel 830 or a panel included with the accessory so as to create an integrated look.

The input and output control buttons and/or touch screens can also be integrated within the accessory housing 822. In addition, and/or as an alternative way to receive and transmit data, an application program by way of Bluetooth, NFC, mesh, or Wi-Fi (but not limited to those) directly or indirectly (e.g., through an internet cloud service) can wirelessly communicate data back and forth between the mobile device 900 and the sensor arrangement 850.

Figure 18:
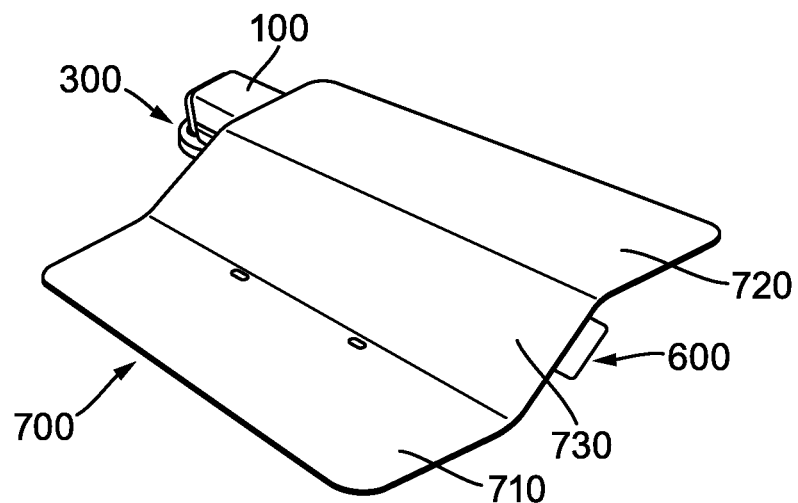
FIG. 18 shows a perspective view of the variable height workstation system in accordance with an embodiment of the present patent application, where the variable height workstation system is in a most compact configuration.

FIG. 18 shows a perspective view of the variable height workstation system 100 in its most compact position. The work platform assembly 700, including its transitioning wall 730 and its upper surface 720, are designed purposefully to nest an articulating arm assembly 550, 200 and 300. The lower adjustable pivot assembly 300 and the upper adjustable pivot assembly 200 are configured to allow the articulating arm assembly 550 to double pivot and double rotate into this nested position.

Figure 8:
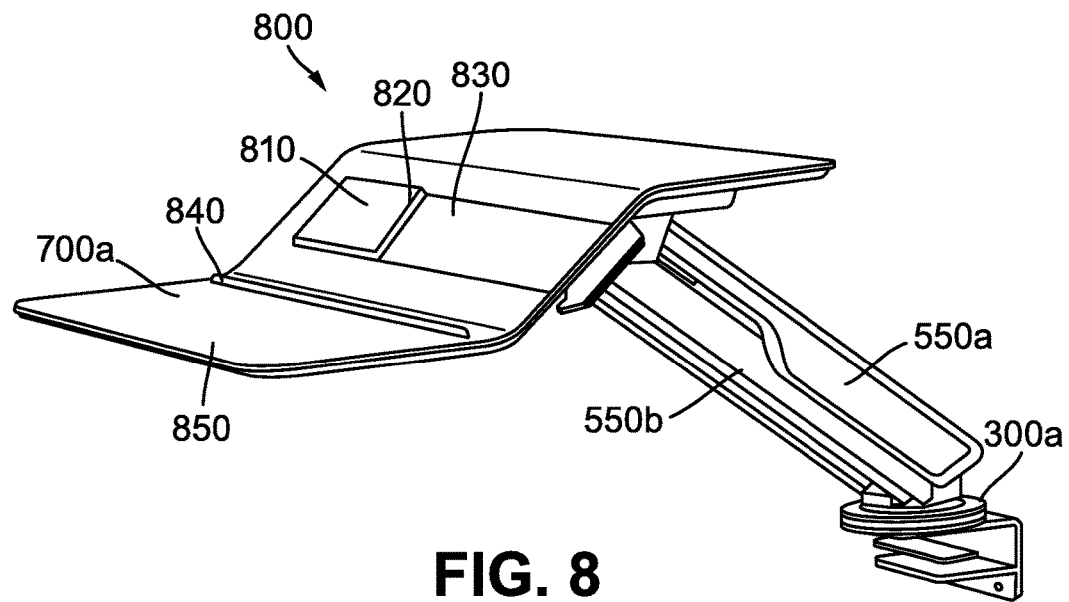
FIG. 8 shows another perspective view of the variable height workstation system with additional features, housings, surface treatments and electronic accessories in accordance with an embodiment of the present patent application.

FIG. 8 shows a perspective view of the variable height workstation system 100 with additional features, housings, surface treatments and electronic accessories. An upper arm cover 550a and a lower arm cover 550b are configured to cover the metal underlay mechanism (i.e., lift mechanism 550), reducing pinch points and provide a cord management feature and cover. The upper and lower arm covers 550a, 550b are optional. A variable height/work platform cover 700a is configured to provide a decorative finish layer such as a laminated layer to the variable height/work platform.

The variable height workstation system 100 may include a control panel/user interface assembly CP, CP' that has an actuator. The actuator has an upper surface and a lower surface facilitating actuation by way of touching of the upper surface or lower surface thereby actuating the lift mechanism 550 to operably raise or lower the variable height platform 700 accordingly. The control panel/user interface assembly CP, CP' has two opposing capacitive sensor elements that allow the operator/user to simple touch lower side of the control panel/user interface assembly CP, CP' to initiate the motorized lift mechanism 550 to extend or raise the variable height platform 700 upwards. In the opposing mode, touching the upper side of the control panel/user interface assembly CP, CP' moves the variable height platform 700 downwards. In one embodiment, the control panel/user interface assembly CP, CP' is configured to remotely (i.e., remotely tethered with optionally wireless control means, Bluetooth, Wi-Fi, NFC as to be activated by a mobile phone, tablet or computer application) activate the lift mechanism 550.

The control panel/user interface assembly CP, CP' includes operational buttons that are selectively programmed as to activate and toggle through optional user selectable memory settings, optional coaching mode settings, etc. The coaching mode settings turns on the capacitively actuated multi sensor array, which communicates with the controller C to process the signal data and function per the user selectable function levels.

Once a lower and an upper height is chosen, each operator can able to store their given preferable positions. As they use the variable height workstation system 100 over a given amount of time, the upper and lower limits will continue to adjust ensuring the users' most recent preferences are stored into the memory.

The capacitive actuated controller C acts as one sensor array, optionally an additional sensor array may be added by way of an antennae extending out from the controller C. The multiple sensor arrays then can detect transitional movement from one area to the next (on the variable height platform 700) accurately and precisely. This sensing feature may also aid in notifying the operator when they have been either sitting or standing too long. The controller C may be configured to notify the user, via an user interface or by visual, audio signal or any other communications means when the operator has been either sitting or standing too long. When movement across the sensor array has been detected, a timer on the controller C would initiate so as to more accurately determine when the controller C should let the operator/user be aware to change their state (e.g., to stand up, walk around or to sit down). The frequency and the manner the controller C signals the operator/user would be selected by the operator by way of selective inputs on the control panel/user interface assembly CP, CP'. The controller C would accumulate the data over time and the operator could access the data by way of a display on the user interface, or mobile application or optionally the data could be uploaded to the cloud as to be accessible by any device the operator chooses.

The control panel/user interface assembly CP, CP' may include a capacitive touch actuator, an optional graphical display, an optional user selectable memory, an optional coaching mode, and a capacitive sensor antenna array. The capacitive touch actuator is configured to be easily accessible to the user. The control panel/user interface assembly CP, CP' may include a Smart Touch feature that provides a touch activated control panel or a capacitive touch panel. The user interface may be a display such as a graphical display. The display may be a touch screen display or a liquid crystal display (LCD) display.

The control panel/user interface assembly CP, CP' optionally includes a graphical display that may be assembled onto the Printed Circuit Board (PCB) to communicate user settings as well the operational status of the variable height workstation system 100 (e.g., height of the variable height platform 700, user memory settings, etc.).

The sensor array may generally include a transmitter for transmitting signals produced by a signal generator of the sensor array and a receiver for receiving back those same signals after they interacted with an environment. As such, the sensor array acts as a proximity sensor device configured to detect the presence of any object (person or other movable living things) within the predetermined area proximate the variable height workstation system. The sensor array is configured to sense the operator's presence, movement and/or position to safely actuate the lift mechanism 550 to move the variable height platform 700 to a predetermined memorized position without the operator/user having to maintain physical contact with the corresponding actuator once it is triggered.

The coaching mode turns on the capacitive actuated multi sensor array and communicates with the controller C to process the signal data and function per the user selected function level.

The control panel/user interface assembly CP, CP' may optionally have capacitive based sensors. Some of capacitive based sensors are configured to act as control actuators that, in turn, allow the control panel/user interface assembly CP, CP' to function as a presence detector as well. Additional presence detectors or sensors that are capacitive based may be added to the variable height workstation system 100 to extend the presence detection features.

The capacitive based sensor array arrangement of the variable height workstation system 100 incorporates both proximity sensing functionality and activity sensing functionality in one self-contained sensor module. This single capacitive based sensor array arrangement is configured to sense activity on the variable height platform 700, across the variable height platform 700 and adjacent to the variable height platform 700. The capacitive based sensor array arrangement of the variable height workstation system 100 is configured to enable field sensing both across the variable height platform 700 and also through (i.e., the material of) the variable height platform 700.

The capacitive based sensor array arrangement of the variable height workstation system 100 is configured to both detect actual movement across the sensor thresholds (i.e., interaction with the variable height platform 700) and to detect presence (proximity to the variable height platform 700) allowing the controller C to react if a predetermined threshold of movement and presence on and above the surface of the variable height platform 700 has been reached. The capacitive based sensor array arrangement of the variable height workstation system 100 is also configured to detect presence both on and adjacent to the variable height platform 700. That is, the single capacitive based sensor array arrangement of the variable height workstation system 100 is configured to do both actions (i.e., proximity AND movement) and detect adjacent proximity and direct proximity and safety. The single capacitive based sensor array arrangement of the variable height workstation system 100 is able to unifying the sensors so as to multi-task them and to able to modularly extend the range/zone.

The capacitive based sensor array arrangement of the variable height workstation system 100 is configured to form a three dimensional sensing arrangement. That is, the capacitive based sensor array arrangement of the variable height workstation system 100 is configured to sense along a front of the variable height platform 700 and lateral edges of the variable height platform 700. The capacitive based sensor array arrangement of the variable height workstation system 100 is configured to sense through (i.e., the thickness) of the variable height platform 700.

The sensors of the capacitive based sensor array arrangement of the variable height workstation system 100 are coupled to the control panel/user interface assembly CP, CP' by using connectors. The sensors have input (e.g., lead wires) going to the controller C.

This array configuration creates exemplary presence sensing zones that are configured to sense presence of the user around the variable height workstation system 100. The exemplary presence sensing zones may extend along at least a front (edge) and a lateral edge of the variable height platform 700. The exemplary presence sensing zones may optionally extend along the back of the variable height platform 700. These sensing zones of the variable height platform 700 are also configured to sense presence of the user through the variable height platform 700 that is supported on the variable height workstation system 100. These sensing zones of the variable height platform 700 are also configured to sense presence of the user through other visually blocking materials or solid materials of/on the variable height platform 700. Each of these sensing zones of the variable height platform 700 are configured to individually detectable. The control panel/user interface assembly CP, CP' is configured to house the controller C such as an integrated controller (IC). The integrated controller C is configured to process and react according to predetermined actions once a multitude of triggering levels have been sensed by the sensor element or elements.

The exemplary presence sensing zones are configured to detect the presence of a hand or a finger of the user on or near a lateral edge of the variable height platform 700 so to prevent incidental pinching of the hand or fingers against another surface or element, i.e., by not allowing the controller C by way of the sensor signal processing to prevent activation of the height adjustment motors of the lift mechanism 550). The variable height workstation system 100 may also include a safety switch that cuts power to the built-in power supply. Additional sensors or sensor elements may be coupled together to extend or shape the sensing zones. The coupling connectors may optionally have an onboard integrated circuit that is configured to help process and extend the sensing capabilities of the interconnected sensing array.

For example, when sensing the presence of the operator/user, the control panel/user interface assembly CP, CP' allows the height adjustment feature to be activated by a single touch to reach a desired height vs. having to keep one's finger on the activation button. If the user leaves the sensing zone, the height adjustment feature would then deactivate as to prevent incidental issues with the variable height platform moving up and down with no one present. Additionally, the presence sensing would allow for a more accurate assessment of the operator's time spent in the sitting and standing positions allowing for more accurate accounting of actual usage within a given position against a given element of time.

In one embodiment, the system 100 is configured to automatically raise and lower itself after it has given a visual and or audio warning or indication it is about to move. In another embodiment, the system 100 is configured to sense that the operator/user is in such a position as to safely decide when to automatically raise or lower itself and to give the operator/user time to over-ride the automatic action. Optionally, the system 100 can be configured to only indicate by visual means (e.g., flashing LED) and audio means (e.g., speaker) when the user/operator is within visual and or audio indication range (e.g., within reach of the system 100) and safely placed (in front of the system 100 with hands on or above the variable height platform 700) as to allow the system 100 to move automatically only when the operator/user is present and fully aware. This allows not only for safe operation, but also is a means to ensure that the system 100 changing its state is observed by the operator/user. Alternatively, the system 100 may indicate to the operator/user when it is the proper time to change orientation (height) as to indicate to the operator/user they should change position allowing the operator/user to indicate back to the system 100 through motion, user input or auditory means that the operator/user accepts the suggestion and actuates the system 100 to change its state. In this method, the operator/user is in total control and would give the input signal to the system 100 as to allow it to change versus the system 100 automatically changing state.

In one embodiment, in a non-motorized version, the system 100 would function similarly; the system 100 could indicate to the operator/user when it is the proper time to change orientation (height) as to indicate to the operator/user that they should change position. The operator/user manually changing the state of the variable height platform 700 would be considered as an input means by the system 100 and the system 100 signals to the controller C of the system 100 that the operator/user accepts the suggestion.

Small movements of the system 100 within the optimal standing or sitting height is advantageous to the operator/ user since these small changes, even if not observed by the operator/user reduces the opportunity for exact repetitive movements to occur which can strain the body. This feature would operate on the motorized version by observing the preferred and confirmed upper (standing) and lower (sitting) positions for the platform—which have been placed into the system 100's memory. Within these preferred settings, the height of the system 100 would vary automatically and seemingly randomly within an acceptable range (e.g., two inches) by moving a quarter of an inch, then one inch, and then reversing itself one inch, and then quarter inch etc. This type of movement can be slowed as to make the operator/user unaware the system 100 is actually changing its state so as to not interfere with the operator's daily task yet still aid the operator as intended by this feature.

In another embodiment of this feature, the system 100 could vary the variable height platform 700's height frequency and range more aggressively as to encourage the operator/user to move themselves in larger ranges of movement (e.g., greater than two inches) and more frequently so as to purposely create a physical challenge for the more athletic operator/user. This type of purposeful movement would simulate a more advanced and challenging sets of movements that can exercise the body. These types of movements would give the operator/user the similar gains as a treadmill desk (i.e., desk that allows the operator to walk on the treadmill while working) without the danger, cost and the larger size and awkwardness associated with such devices. In the manually operated embodiment of this feature, the operator/user would be encouraged by the system 100 to manually move the variable height platform 700 more often so as to gain the benefits that come from the more challenging constant and greater ranges of movements associated with this feature.

The controller C of the variable height workstation system 100 may be configured to receive the sensor inputs. The controller C, based on the sensor inputs, may be also configured to control the operation of the variable height workstation system 100. The controller C takes into consideration the received sensor readings when actuating the variable height workstation system 100 to react, signal, communicate, and automatically respond to the received signals depending on the predetermined conditions programmed into the variable height workstation system 100 and/or a virtual digital machine residing in "the cloud" or a remote server in communication with the variable height workstation system 100. The controller C may include a control circuit. However, the controller may alternatively include any other type of suitable controller without deviating from the scope of the present patent application. For example, the controller may include a processor executing code; an integrated computer system running a program; analog or digital circuitry; etc.

The variable height workstation system 100 may also include a memory device connected to, or integral with, the controller C for storing information related to the variable height workstation system 100. The stored information, for example, may include predetermined threshold ranges, predetermined criteria, determined cycles, patterns and usage of the variable height platform system. The memory device may also be configured to store other settings or parameters of the variable height workstation system 100. The controller C may store information within the memory device and may subsequently retrieve the stored information from the memory device. The memory device may include any suitable type of memory, such as, for example, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), a Flash memory or any other suitable memory.

The capacitive sensor array arrangement CS is mounted on the variable height platform's support 510 (and is disposed on the underside of the variable height platform 700) and specifically points towards the operator/user. The capacitive sensor array arrangement CS is operatively connected to the variable height platform 700. The capacitive sensor array arrangement CS is configured to sense the position and movement of a user on, above and around the variable height workstation system 100 for outputting data to determine how the user is positioned on, above and around the variable height workstation system 100 in comparison to a predetermined target position. The processor C is configured to: receive the data from the sensor arrangement, compare the received data to a predetermined target position, and display an indication of the comparison to the user. The variable height platform system 100 also includes a display device with a processor. The sensor arrangement may include the sensors. For example, the processor is configured to compare the data against the user's activity preferences while taking into consideration the user's experience curve. This helps to ensure the variable height workstation system 100 properly recommends when the user should change states/positions. These recommendations may be determined by the following, or any combination of the following: sensor readings/data, position of the variable height platform, how much active time the user has spent at certain (sitting/standing) positions as compared to the user's experience curve and their preference settings. In one embodiment, the sensors may also be used in the non-motorized version of the variable height platform system. For example, as the sensors do not use a lot of power, the sensor may be powered by a USB cable or a battery in the non-motorized or manual version of the variable height workstation system.

Active movement sensors create a sensor array or arrangement that is configured to detect an operator's movement on, across and above the platform. Operator sensing active movement sensors are configured to create sensing/sensor zones that can detect movement on, above and around the platform. These zones when overlapped have varied sensitivity and as a hand of the operator moves around and through these zones, varied signals levels are detected and transmitted to the controller. In one embodiment, the actions of keying on a keyboard, moving an input device such as a mouse, even writing on the surface of the platform are be detected and registered as active movement and engagement with the variable height platform system. The detection of movement (and not just the presence of a person/an operator near the variable height workstation system) ensures that the variable height workstation system only credits active system vs. a resting state or a person/an operator being simply near the variable height workstation system and not engaging it as intended. This arrangement of sensors allows for a higher resolution and recognition of certain intentional movements that may be used to signal and activate a predetermined action. For example, both hands moving forward over the surface signals the controller C to make the variable height workstation system rise and alternatively, both hands moving backwards over the surface of the platform, signals the controller to make the variable height workstation system lower itself. This arrangement in such a device is also able to detect the presence of certain products that have been given key resistive or capacitance values. For example, a keyboard wrist rest would give out a passive resistive or capacitive signal of a specific value. When the keyboard wrist rest is placed upon the platform, the active movement sensors are configured to detect the specific resistive or capacitive value and signal the presence of the wrist rest to the device's controller. It is well known that using ergonomic accessories such as a wrist rest (not shown) allows the operator to do a given task like keyboarding in an ergonomically healthier way and the controller would then allow the person to get so called ergonomic credit for having and using such a device. Starting with a higher ergonomic value would allow the person/operator to work at a specific task longer and the controller detecting the presence of the wrist rest by way of the active movement sensors would then alter the timing sequences accordingly. The more specialized ergonomic devices used by the operator, the longer they are allowed to work in a given state as compared to the time when not using such a device. This present application uniquely senses and recognizes these configurations and devices as to react properly and uniquely through the controller and a sequence of predetermined actions then may be activated by the controller.

Through observation and research, the inventors of the present patent application have recognized the need for a variable height workstation system, which senses the user's active engagement with the system's tabletop in such a way as to aid or coach them in the process of integrating the sit/stand more readily into their office lifestyle. This is accomplished by sensing the user's active engagement with the system, by detecting user's movement through sensing zones (e.g., on the variable height platform 700), and the use of a controller and specialized firmware that are configured to help the operator/user to stand gradually and more often during their daily routine until the optimal daily recommended time is reached. The variable height workstation system 100 accomplishes this through the use of an arrangement of surface movement sensors which tracks a user's activity into and through certain sensor zones (e.g., on the variable height platform 700) in such a way as to detect the operator's engagement and usage of the variable height workstation system 100. This detection method allows for an accurate determination of activity and actual engagement with the variable height workstation system 100 versus just presence or proximity around the variable height workstation system 100. This detection of actual activity and engagement gives a more accurate determination as to when the variable height workstation system 100 should signal to the operator/user when they should change their current state (e.g., when to stand and when to sit). The accurate sensing and tracking of the active engagement and the ability to compare the readings against the operator's activity preferences while taking into consideration the operator's experience curve will help to ensure the variable height workstation system 100 properly recommends when the operator should change states/positions. These recommendations can be determined by the following, or any combination of the following: sensor readings, position of the variable height workstation system, how much active time they have spent at certain positions as compared to the operators experience curve and their preference settings. This feature ensures that the users do not under-use or over-use the variable height workstation system from the point they first use the variable height workstation system to the point when they have become an experienced operator.

The controller C may also be configured to produce/generate an alarm in response to the determination that the one or more components of the variable height workstation system 100 are not functioning in accordance with the predetermined criteria. The variable height workstation system 100 may include the control panel/user interface. The user interface may be operatively connected to the controller C and is configured to display information (e.g., operational performance) of the variable height workstation system 100 to a user, and/or solicit information from the user (e.g., allow the user to enter data and/or other parameters of the variable height workstation system 100). The control panel/user interface is configured to be operatively connected to the variable height workstation system 100 to control the operation of the variable height workstation system 100. The control panel/user interface may include one or more buttons or other controls that allow the user to modify one or more parameters of the variable height workstation system 100. For example, the one or more buttons or other controls of the user interface may be operated by touch or tactile manipulation or mechanical type control.

The control panel/user interface resides on the variable height workstation system 100 to provide feedback about the state of operation of the variable height workstation system 100 to the user. The control panel/user interface may optionally have input controls for the user. The input controls of the user interface may change the orientation of, and/or the information displayed thereon. The control panel/user interface is configured to display one or more of the following data: sensor readings, operational state of the variable height workstation system 100, etc. The control panel/user interface is configured to display sensor data in an easily understandable format to the user. Based on the displayed data/information, the user can observe the variable height workstation system's state of operation and its effectiveness, and/or the user can determine if the settings of the variable height workstation system 100 are optimized. The control panel/user interface may be hardwired or wireless. The control panel/user interface may be battery powered or may be powered by the power source of the variable height workstation system. The control panel/user interface assembly CP, CP' may include a controller therein.

The receivers and the transmitters of the variable height workstation system 100 are configured to establish a communication link or communication network between the controller(s), the user interface/control panel(s), the sensor(s), and the drive mechanism(s) of the variable height workstation system 100 prior to the transmission of information or signals. The communication network may include any communication network such as the telephone network, wide area network, local area network, Internet or wireless communication network. Examples of wireless communications may include Bluetooth, RF, Wi-Fi, infrared, ultrasonic, or any other wireless connection.

The present patent application and its various embodiments as described above uniquely address the observed, noted and researched findings and improve on the prior and current state of the art products/devices/systems. The disclosed features and embodiments of the present patent application can be applied to a range of products that are moving platform based products.

Although the present patent application has been described in detail for the purpose of illustration, it is to be understood that such detail is solely for that purpose and that the present patent application is not limited to the disclosed embodiments, but, on the contrary, is intended to cover modifications and equivalent arrangements that are within the spirit and scope of the appended claims. In addition, it is to be understood that the present patent application contemplates that, to the extent possible, one or more features of any embodiment can be combined with one or more features of any other embodiment.

The illustration of the embodiments of the present patent application should not be taken as restrictive in any way since a myriad of configurations and methods utilizing the present patent application can be realized from what has been disclosed or revealed in the present patent application. The listed products, systems, features and embodiments as described in the present patent application should not be considered as limiting in any way. The illustrations are representative of possible construction and mechanical embodiments and methods to obtain the desired features. The location and/or the form of any minor design detail or the material specified in the present patent application can be changed and doing so will not be considered new material since the present patent application covers those executions in the broadest form.

The foregoing illustrated embodiments have been provided to illustrate the structural and functional principles of the present patent application and are not intended to be limiting. To the contrary, the present patent application is intended to encompass all modifications, alterations and substitutions within the spirit and scope of the appended claims.

What is claimed is:

1. A variable height workstation system comprising:
a base configured to be in contact with a support surface;
a variable height platform;
a lift mechanism configured to move the variable height platform between a fully lowered position and a raised position;
a lower adjustable pivot assembly configured to be pivotally connected to the base and a lower end of the lift mechanism, wherein the lower adjustable pivot assembly comprises a lower pivot member configured to be rotated about a first vertical rotational axis;
an upper adjustable pivot assembly configured to be pivotally connected to an upper end of the lift mechanism and fixedly connected to the variable height platform, wherein the upper adjustable pivot assembly comprises an upper pivot member configured to be rotated about a second vertical rotational axis spaced from the first vertical rotational axis; and
an actuator configured to adjust at least one selected from the group consisting of:
an amount of force required to rotate the lower pivot member about the first vertical rotational axis and relative to the base; and
an amount of force required to rotate the upper pivot member with the variable height platform fixedly connected thereto about the second vertical rotational axis.

2. The variable height workstation system of claim 1, wherein the lower adjustable pivot assembly is configured to adjust an angle of the lower pivot member about a first horizontal longitudinal axis and/or about a first horizontal transverse axis.

3. The variable height workstation system of claim 1, wherein the upper adjustable pivot assembly is configured to adjust an angle of the upper pivot member about a second horizontal longitudinal axis and/or about a second horizontal transverse axis.

4. The variable height workstation system of claim 1, wherein the lower adjustable pivot assembly further comprises a lower adjustable force regulator configured to adjust the amount of force required to rotate the lower pivot member about the first vertical rotational axis and relative to the base;
wherein the actuator is configured to actuate the lower adjustable force regulator to adjust the amount of force required to rotate the lower pivot member about the first vertical rotational axis and relative to the base; and
wherein the lower adjustable pivot assembly further comprises a first lock configured to move between a lock position and a release position, wherein, in the lock position, the first lock is configured to prevent the lower adjustable force regulator from adjusting the amount of force required to rotate the lower pivot member about the first vertical rotational axis and relative to the base.

5. The variable height workstation system of claim 1, wherein the upper adjustable pivot assembly further comprises an upper adjustable force regulator configured to adjust the amount of force required to rotate the upper pivot member with the variable height platform fixedly connected thereto about the second vertical rotational axis;
wherein the actuator is configured to actuate the upper adjustable force regulator to adjust the amount of force required to rotate the upper pivot member with the variable height platform fixedly connected thereto about the second vertical rotational axis; and
wherein the upper adjustable pivot assembly further comprises a second lock configured to move between a lock position and a release position, wherein, in the lock position, the second lock is configured to prevent the upper adjustable force regulator from adjusting the amount of force required to rotate the upper pivot member with the variable height platform fixedly connected thereto about the second vertical rotational axis.

6. A variable height workstation system comprising:
a base configured to be in contact with a support surface;
a variable height platform;
a lift mechanism configured to move the variable height platform between a fully lowered position and a raised position;
a lower adjustable pivot assembly configured to be pivotally connected to the base and a lower end of the lift mechanism; and
an upper adjustable pivot assembly configured to be pivotally connected to an upper end of the lift mechanism and fixedly connected to the variable height platform, wherein the upper adjustable pivot assembly comprises an upper pivot member configured to be rotated about a first vertical rotational axis,
wherein the upper adjustable pivot assembly comprises an upper adjustable force regulator configured to adjust an amount of force required to rotate the upper pivot member with the variable height platform fixedly connected thereto about the first vertical rotational axis.

7. The variable height workstation system of claim 6, wherein the lower adjustable pivot assembly comprises a lower pivot member configured to be rotated about a second vertical rotational axis spaced from the first vertical rotational axis, and
wherein the lower adjustable pivot assembly comprises a lower adjustable force regulator configured to adjust an amount of force required to rotate the lower pivot member about the second vertical rotational axis and relative to the base.

8. A variable height workstation system comprising:
a base configured to be in contact with a support surface;
a variable height platform;

a lift mechanism configured to move the variable height platform between a fully lowered position and a raised position;
a lower adjustable pivot assembly configured to be pivotally connected to the base and a lower end of the lift mechanism, wherein the lower adjustable pivot assembly comprises a lower pivot member configured to be rotated about a first vertical rotational axis;
an upper adjustable pivot assembly configured to be pivotally connected to an upper end of the lift mechanism and fixedly connected to the variable height platform, wherein the upper adjustable pivot assembly comprises an upper pivot member configured to be rotated about a second vertical rotational axis spaced from the first vertical rotational axis;
a lower adjustable force regulator configured to adjust an amount of force required to rotate the lower pivot member about the first vertical rotational axis and relative to the base; and
an upper adjustable force regulator configured to adjust an amount of force required to rotate the upper pivot member with the variable height platform fixedly connected thereto about the second vertical rotational axis;
wherein the upper adjustable force regulator and the lower adjustable force regulator are each configured for separate operation of the upper pivot assembly and the lower pivot assembly at different force settings from one another.

9. A variable height workstation system comprising:
a base configured to be in contact with a support surface;
a variable height platform;
a lift mechanism configured to move the variable height platform between a fully lowered position and a raised position;
a lower adjustable pivot assembly configured to be pivotally connected to the base and a lower end of the lift mechanism;
an upper adjustable pivot assembly configured to be pivotally connected to an upper end of the lift mechanism and fixedly connected to the variable height platform;
a sensor configured to sense position and movement of a user in a predetermined area that is on the variable height platform and proximate the variable height platform; and
a controller operatively connected to the sensor, the lift mechanism, the upper adjustable pivot assembly and the lower adjustable pivot assembly,
wherein the controller is configured to operate the lift mechanism, the upper adjustable pivot assembly and the lower adjustable pivot assembly in response to the sensor sensing the position and movement of the user in the predetermined area.

10. The variable height workstation system of claim 9, wherein the sensor is a capacitive sensor.

11. A variable height workstation system comprising:
a base configured to be in contact with a support surface;
a variable height platform;
a lift mechanism configured to move the variable height platform between a fully lowered position and a raised position;
a lower adjustable pivot assembly configured to be pivotally connected to the base and a lower end of the lift mechanism, wherein the lower adjustable pivot assembly comprises a lower pivot member configured to be rotated about a first vertical rotational axis;
an upper adjustable pivot assembly configured to be pivotally connected to an upper end of the lift mechanism and fixedly connected to the variable height platform, wherein the upper adjustable pivot assembly comprises an upper pivot member configured to be rotated about a second vertical rotational axis spaced from the first vertical rotational axis;
a lower adjustable force regulator configured to adjust an amount of force required to rotate the lower pivot member about the first vertical rotational axis and relative to the base; and
an upper adjustable force regulator configured to adjust an amount of force required to rotate the upper pivot member with the variable height platform fixedly connected thereto about the second vertical rotational axis;
a lock configured to move between a lock position and a release position, wherein, in the lock position, the lock is configured to prevent at least one of the following:
the upper adjustable force regulator from adjusting the amount of force required to rotate the upper pivot member with the variable height platform fixedly connected thereto about the second vertical rotational axis; and
the lower adjustable force regulator from adjusting the amount of force required to rotate the lower pivot member about the first vertical rotational axis and relative to the base.

12. A variable height workstation system comprising:
a base configured to be in contact with a support surface;
a variable height platform, the variable height platform having a generally horizontal work platform and an accessory platform that is connected to the generally horizontal work platform, the accessory platform being tilted at an angle with respect to the generally horizontal work platform; and
a lift mechanism configured to move the variable height platform between a fully lowered position and a raised position,
wherein the accessory platform includes one or more power outputs that are configured to be powered by an external power supply and are configured to output power to one or more powered accessories when supported on the accessory platform using power from the external power supply.

13. The variable height workstation system of claim 12, wherein the generally horizontal work platform is a generally horizontal lower work platform,
wherein the variable height platform also includes a generally horizontal upper work platform, the lower work platform and the upper work platform are interconnected by the accessory platform, the lower work platform and the upper work platform being spaced apart in both a generally horizontal direction and a generally vertical direction, the accessory platform being disposed between the lower work platform and the upper work platform and being tilted at an angle with respect to the lower work platform and the upper work platform.

14. The variable height workstation system of claim 12, wherein the one or more powered accessories is selected from the group consisting of a charging module, docking accessories, a user activity sensor, a speaker, a USB connector, a personal and localized air treatment device, a user interface device, a headset amplifier plug, a digital readout, and a cord management device.

15. The variable height workstation system of claim 14, wherein the charging module is configured to charge a portable electronic device supported on the accessory platform and is selected from the group consisting of a wired charging module, a wireless charging module, and a USB charging module.

16. The variable height workstation system of claim 12, wherein each of the one or more powered accessories includes a housing configured to be secured to the accessory platform and a controller disposed in the housing, and
wherein the controller is configured to control an operation of the respective one or more powered accessories.

17. The variable height workstation system of claim 12, wherein a sloped configuration of the accessory platform is configured support a portable electronic device on the accessory platform a viewing angle.

18. The variable height workstation system of claim 17, wherein the accessory platform comprises a charging device and a retainer thereon, and wherein the sloped configuration of the accessory platform and the retainer are configured to position of the portable electronic device on the accessory platform and with respect to the charging device for charging the portable electronic device.

19. The variable height workstation system of claim 12, wherein the variable height platform includes a power switch and other electrical contacts for connecting to an external power source for operation of the variable height workstation system and for operation of the one or more powered accessories.

20. The variable height workstation system of claim 12, wherein the accessory platform is configured to provide routing and/or storage of electrical cables that electrically couple the one or more powered accessories to the variable height platform and/or to provide routing and/or storage of communication cables.

21. A variable height workstation system comprising:
a variable height platform, the variable height platform having a generally horizontal lower work platform and a generally horizontal upper work platform, the lower work platform and the upper work platform are interconnected by an intermediate support, the lower work platform and the upper work platform being spaced apart in both a generally horizontal direction and a generally vertical direction, the intermediate support being disposed between the lower work platform and the upper work platform and being tilted at an angle with respect to the lower work platform and the upper work platform; and
a lift mechanism configured to move the variable height platform between a fully lowered position and a raised position,
wherein the intermediate support includes a power output that is configured to be powered by an external power supply and is configured to output power to a portable electronic device supported thereon using power from the external power supply, and
wherein a sloped configuration of the intermediate support is configured to support the portable electronic device on the intermediate support a viewing angle.

22. The variable height workstation system of claim 21, wherein the power output include a power outlet, a wireless charging module, or any combination thereof.

23. The variable height workstation system of claim 21, wherein the intermediate support comprises a charging device and a retainer thereon, and
wherein the sloped configuration of the intermediate support and the retainer are configured to position of the portable electronic device on the intermediate support and with respect to the charging device for charging the portable electronic device.

24. The variable height workstation system of claim 21, wherein the power output of the intermediate support is one of a plurality of power outputs,
wherein one or more power outputs of the plurality of power supports of the intermediate support are configured to power one or more powered accessories supported thereon using the power from the external power supply, and
wherein the one or more powered accessories supported on the intermediate support are easily accessible by a user of the variable height workstation system.

25. The variable height workstation system of claim 24, wherein the one or more powered accessories is selected from the group consisting of a charging module, docking accessories, a user activity sensor, a speaker, a USB connector, a personal and localized air treatment device, a user interface device, a headset amplifier plug, a digital readout, and a cord management device.

26. The variable height workstation system of claim 24, wherein the one or more power outputs include one or more power outlets, one or more wireless charging modules, or any combination thereof.

27. The variable height workstation system of claim 12, wherein the one or more power outputs are included on an angled support member for supporting the one or more powered accessories at an angle.

* * * * *